(12) United States Patent
Sivertsen

(10) Patent No.: US 9,313,855 B1
(45) Date of Patent: Apr. 12, 2016

(54) INTELLIGENT LIGHTING SYSTEM AND INTEGRATED CIRCUIT FOR DETERMINING AMBIENT LIGHT INTENSITY

(71) Applicant: AMERICAN MEGATRENDS, INC., Norcross, GA (US)

(72) Inventor: Clas Gerhard Sivertsen, Lilburn, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 101 days.

(21) Appl. No.: 14/050,059

(22) Filed: Oct. 9, 2013

(51) Int. Cl.
| | |
|---|---|
| H05B 37/02 | (2006.01) |
| H05B 39/04 | (2006.01) |
| H05B 41/36 | (2006.01) |
| H05B 33/08 | (2006.01) |

(52) U.S. Cl.
CPC .................................. *H05B 33/0854* (2013.01)

(58) Field of Classification Search
None
See application file for complete search history.

(56) References Cited

U.S. PATENT DOCUMENTS

| | | |
|---|---|---|
| 7,141,779 B1 | 11/2006 | Chew et al. |
| 2003/0122749 A1 | 7/2003 | Booth et al. |
| 2009/0160627 A1* | 6/2009 | Godbole ................. 340/310.11 |
| 2010/0182294 A1 | 7/2010 | Roshan et al. |
| 2012/0001567 A1* | 1/2012 | Knapp et al. .................. 315/291 |
| 2012/0032608 A1* | 2/2012 | Nerone ......................... 315/291 |
| 2013/0134891 A1* | 5/2013 | Woytowitz .................... 315/201 |

\* cited by examiner

*Primary Examiner* — Anh Tran
(74) *Attorney, Agent, or Firm* — Locke Lord LLP; Tim Tingkang Xia, Esq.

(57) ABSTRACT

One aspect of the present disclosure relates to an intelligent lighting control system for controlling a lighting LED array. The intelligent lighting control system includes: (a) an intelligent power control configured to allow an operator to control the lighting of an intelligent lighting system, (b) an AC power source configured to provide AC power to the intelligent lighting system, (c) an intelligent power supply configured to combine the control signal from the intelligent power control and AC power supply from the AC power source, (d) an intelligent lighting system configured to provide lighting through a lighting LED array, and (e) a DC power supply configured to provide DC power supply to control circuits and the lighting LED array.

25 Claims, 14 Drawing Sheets

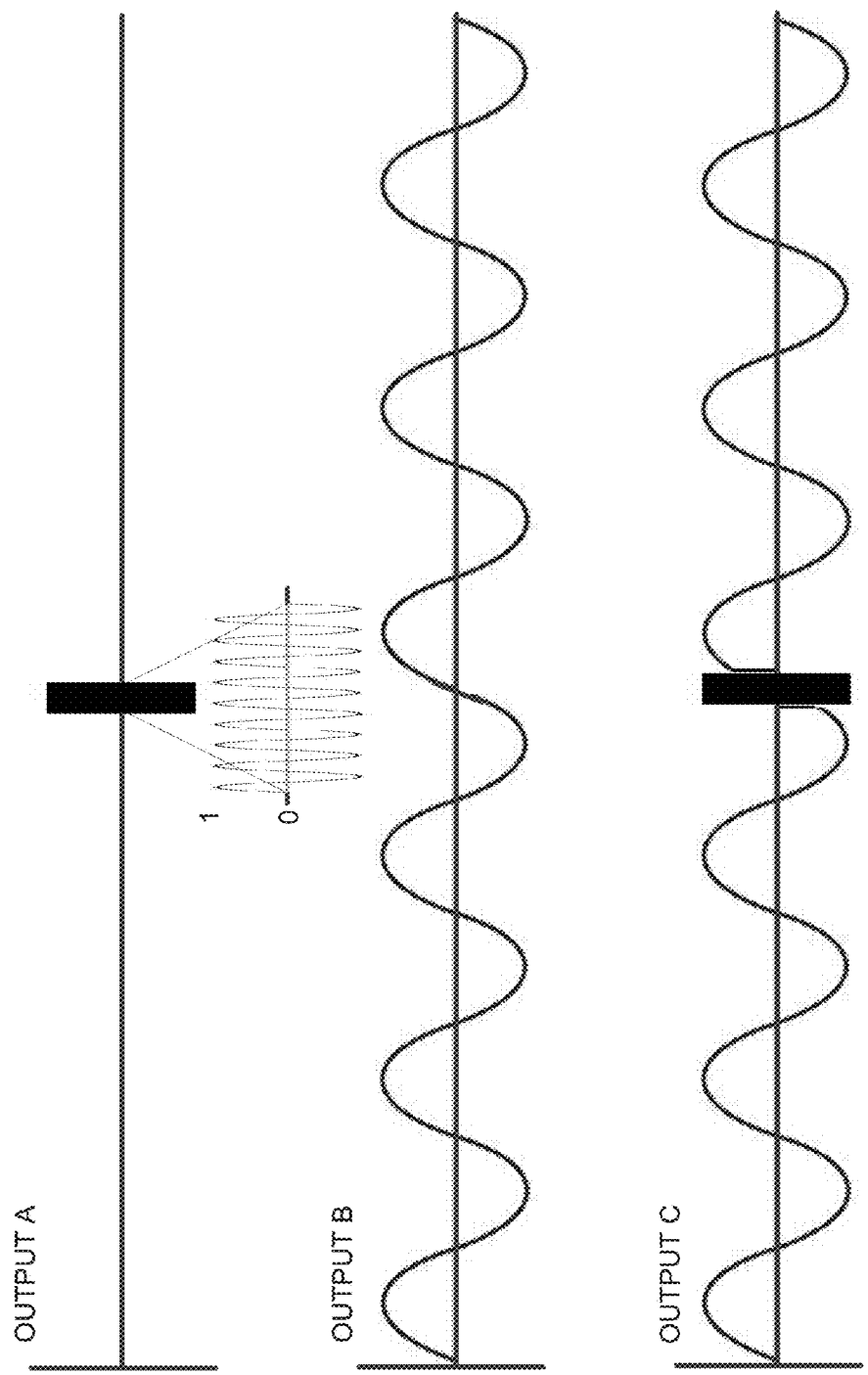

INTELLIGENT LIGHTING SYSTEM AND INTEGRATED CIRCUIT FOR DETERMINING AMBIENT LIGHT INTENSITY

TECHNICAL FIELD

The present disclosure relates to an apparatus and a method to detect ambient light and control light, and more particularly, relates to an optical system to provide light, detect ambient light intensities, adjust lighting according to the ambient light intensities, and transmit data to control the light using a light emit diode (LED) light fixture.

BACKGROUND

Light Fixtures with LEDs are becoming increasingly popular due to following advantages over fluorescent tubes and/or incandescent bulbs and: (a) lower power consumption, (b) longer life expectancy, (c) vibration and shock resistance of LEDs. Although the power saving of LED light fixtures is apparent, however, if the lights remain on in an area where no lights is needed, enormous amount of energy has been wasted by streetlights, illumination of office buildings, hallways, flood-lights of parking lots, and farms, when sufficient ambient lighting exist. On the other hand, certain places such as hallways, office buildings and parking lots must maintain sufficient lighting to ensure the safety and security of the occupants. Therefore, the mandate of conserving energy and natural resources requires the owner of these places to provide sufficient lighting where the lighting is needed, but automatically adjust the lighting (energy consumption) while the ambient light changes and turn off the lighting when the places are sufficiently illuminated.

The traditional method is to turn off lights by means of mechanical switches, timers, or photo-diode sensors, however, these add further cost and wiring complexity, and as all electronic components are prone to failure which increases the return rate, services calls, and service requirements of the product. The key disadvantages of these approaches are: (a) the mechanical switches and timers can't maintain the lighting in place where the lighting is always needed, and (b) photo-diode sensors can turn off the lighting at certain ambient light level, but they are unable to maintain minimum consumption of energy. A system that can (a) provide lighting when it is dark, (b) provide supplemental lighting when ambient light is low, and (c) can turn off the lighting when the ambient light reaches a predetermined threshold, is desirable.

Therefore, heretofore unaddressed needs still exist in the art to address the aforementioned deficiencies and inadequacies.

SUMMARY

In one aspect, the present disclosure relates to an intelligent lighting control system. In one embodiment, the intelligent lighting control system includes: (a) an intelligent power control configured to allow an operator to control the lighting of an intelligent lighting system, (b) an AC power source configured to provide AC power to the intelligent lighting system, (c) an intelligent power supply configured to combine the control signal from the intelligent power control and AC power supply from the AC power source, (d) an intelligent lighting system configured to provide lighting through a plurality of lighting light-emitting diodes (LED) arrays, and (e) a DC power supply configured to provide DC power supply to control circuits and the plurality lighting LED arrays.

In certain embodiments, the intelligent power control interrupts the power transmission from the intelligent power supply to the intelligent lighting system to transmit control signals and the control signals control turning on/off, and changing brightness, color, and temperature of the plurality of lighting LED arrays. In certain embodiments, the intelligent power control uses a control signal transmitter and a control signal receiver to control signals control turning on/off, and changing brightness, color, and temperature of the plurality of lighting LED arrays. The control signal transmitter includes a number of lighting LED arrays, a separate lighting LED, and a separate light emitter. The control signal receiver includes lighting LED arrays operating in a light detection mode, as well as a separate light sensor.

In one embodiment, the intelligent power supply encodes the control signals received from the intelligent power control, modulates the encoded control signal, combines the modulated encoded control signal and transmits the combined signal to the intelligent lighting system. The intelligent power supply transmits the combined signal to the intelligent lighting system in at least one of the two methods: over an electric power wire, or over a light transmitter and light receiver pair using light or infrared signal. The light receiver of the light transmitter and light receiver pair includes at least one of an LED operating in a light detection mode, and a light sensor. In certain embodiments, the intelligent lighting system decodes the modulated encoded control signal and performs control functions. The intelligent lighting control system further includes a filter configured to decode the modulated encoded control signal and to transmit the digital control signal to a control signal input terminal of the intelligent lighting system. The intelligent lighting control system further includes a CAT-5 data cable configured to transmit the output of the intelligent power supply to the intelligent lighting system. The wires of the CAT-5 data cable are combined to form a two wire power transmission line.

In certain embodiments, the DC power supply includes: (a) an AC to DC converter circuit configured to convert the AC to DC, and (b) a regulator circuit configured to provide steady and precise DC voltage for the intelligent lighting system. The DC power supply further includes a DC to DC converter circuit to provide multiple DC voltages for the control circuit of the intelligent lighting system and driving the plurality of lighting LED arrays separately.

In certain embodiments, the intelligent lighting system includes: (a) a lighting LED array configured to operate in light emission mode, light detection mode, and data transmission mode, (b) a light detection module configured to detect the ambient lighting, convert detected ambient lighting to digital data, (c) a processor configured to receive digital control signal from the intelligent power control, and the digital data representing ambient light from the light detection module, and (d) an LED PWM driver configured to receive control signal from the processor and control the lighting of the lighting LED array according to the control signal from the processor. The light detection module includes: (a) a first gate control, (b) a second gate control, (c) an operational amplifier configured to receive photovoltaic voltage generated by the lighting LED array during the lighting LED array light off cycle and when the lighting LED array is operating in light detection mode and amplify the receive photovoltaic voltage as a measurement of ambient light intensity, and (d) an analog to digital converter configured to convert the amplified photovoltaic voltage into digital data. The anode of the lighting LED array is electrically coupled to the first gate control, a power supply, and the processor, and the cathode of the lighting LED array is electrically coupled to the second gate control, a ground voltage, and the processor, respectively. The processor controls the switches of the first gate control and the second gate control such that the lighting LED array is configured to operate in light emission mode, light detection mode and the data transmission mode in a PWM duty cycle. The photovoltaic voltage is detected within a predetermined period of time after the lighting LED array are set to operate in light detection mode and the lighting LED array is not in light emission mode.

In certain embodiments, the light detection module includes: (a) an separate light sensor, (b) an operational amplifier configured to receive the output of the separate light sensor representing the ambient lighting, and (c) an analog to digital converter configured to convert the amplified photovoltaic voltage into digital data. The output of the separate light sensor is electrically coupled to the input of the operational amplifier. The output of the operational amplifier is electrically coupled to the analog to digital converter. The output of the analog to digital converter is electrically coupled to the digital data input of the processor. The processor controls the output of the LED PWM Driver such that the lighting intensity of the lighting LED array is controlled.

In another aspect, the present disclosure relates to a method of operating an intelligent lighting control system. In certain embodiments, the method includes: (a) providing a lighting LED array configured to operate in light emission mode and light detection mode, (b) controlling the lighting LED array by an LED power width modulation (PWM) driver of an intelligent lighting system coupled to the lighting LED array, (c) periodically determining ambient light intensities with a light detection device, and storing the average voltage of the ambient light intensities measured as a variable V, (d) adjusting ambient light to sufficient lighting such that no additional lighting is needed, and store the average voltage of the ambient light intensity measured as a constant $V_{max}$, (e) adjusting ambient light to lowest lighting such that additional lighting is needed, and store the average voltage of the ambient light intensity measured as a constant $V_{min}$, (f) providing lighting with sufficient number of LED in the lighting LED array such that the area has sufficient lighting when the ambient light is at the lowest light intensity, and (g) controlling duty cycle of the LED PWM driver based on the variable V, and two constants $V_{max}$, and $V_{min}$.

In certain embodiments, the light detection device includes: (a) a first gate control, (b) a second gate control, (c) an operational amplifier configured to receive photovoltaic voltage generated by the lighting LED array during the lighting LED array light off cycle and when the lighting LED array is operating in light detection mode and amplify the receive photovoltaic voltage as a measurement of ambient light intensity, and (d) an analog to digital converter configured to convert the amplified photovoltaic voltage into digital data. The anode of the lighting LED array is electrically coupled to the first gate control, a power supply, and the processor, and the cathode of the lighting LED array is electrically coupled to the second gate control, a ground voltage, and the processor, respectively. The processor controls the switches of the first gate control and the second gate control such that the lighting LED array is configured to operate in light emission mode, light detection mode and the data transmission mode in a PWM duty cycle.

In certain embodiments, the photovoltaic voltage is detected within a predetermined period of time after the lighting LED array are set to operate in light detection mode and the lighting LED array is not in light emission mode. The light detection device includes: (a) an separate light sensor, (b) an operational amplifier configured to receive the output of the separate light sensor representing the ambient lighting, and (c) an analog to digital converter configured to convert the amplified photovoltaic voltage into digital data. The output of the separate light sensor is electrically coupled to the input of the operational amplifier. The output of the operational amplifier is electrically coupled to the analog to digital converter. The output of the analog to digital converter is electrically coupled to the digital data input of the processor. The processor controls the output of the LED PWM Driver such that the lighting intensity of the lighting LED array is controlled.

In certain embodiments, the method further includes: (a) storing $V_{max}$ if the variable V is greater than $V_{max}$, and (b) storing $V_{min}$ if the variable V is less than $V_{min}$. The duty cycle is determined by a formula as below:

$$\text{Duty Cycle} = 100*V/(V_{min}-V_{max})+100*V_{max}/(V_{max}-V_{min}).$$

In another aspect, the present disclosure relates to a non-transitory computer storage medium. The non-transitory computer storage medium contains computer-executable instructions. In certain embodiments, when the computer-executable instructions are executed by a processor of an intelligent lighting system, cause the processor to: (a) provide N lighting LED arrays arranged to operate in light emission mode and light detection mode, (b) control the N lighting LED arrays by a power width modulation (PWM) driver embedded in a system-on-chip coupled to the N lighting LED arrays, (c) periodically determine ambient light intensities with a light detection device, and store the average voltage of the ambient light intensities measured as a variable V, (d) adjust ambient light to sufficient lighting such that no additional lighting is needed, and store the average voltage of the ambient light intensity measured as a constant $V_{max}$, (e) adjust ambient light to lowest lighting such that additional lighting is needed, and store the average voltage of the ambient light intensity measured as a constant $V_{min}$, (f) provide lighting with sufficient number of lighting LED arrays such that the area has sufficient lighting when the ambient light is at the lowest light intensity, and (g) control duty cycle of the PWM driver based on the variable V, and two constants $V_{max}$, and $V_{min}$. The light detection device includes at least one of the N lighting LED arrays operating in a light detection mode, and a light sensor. The non-transitory computer storage medium further includes the computer-executable instructions (a) to store $V_{max}$ if the variable V is greater than $V_{max}$, and (b) to store $V_{min}$ if the variable V is less than $V_{min}$.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 2B illustrates a modulated control signal waveform from the Intelligent lighting control system, an AC power supply waveform from an AC power source, and a combined signal waveform output at an intelligent power supply according to embodiment of the present disclosure;

DETAILED DESCRIPTION

Figure 1:
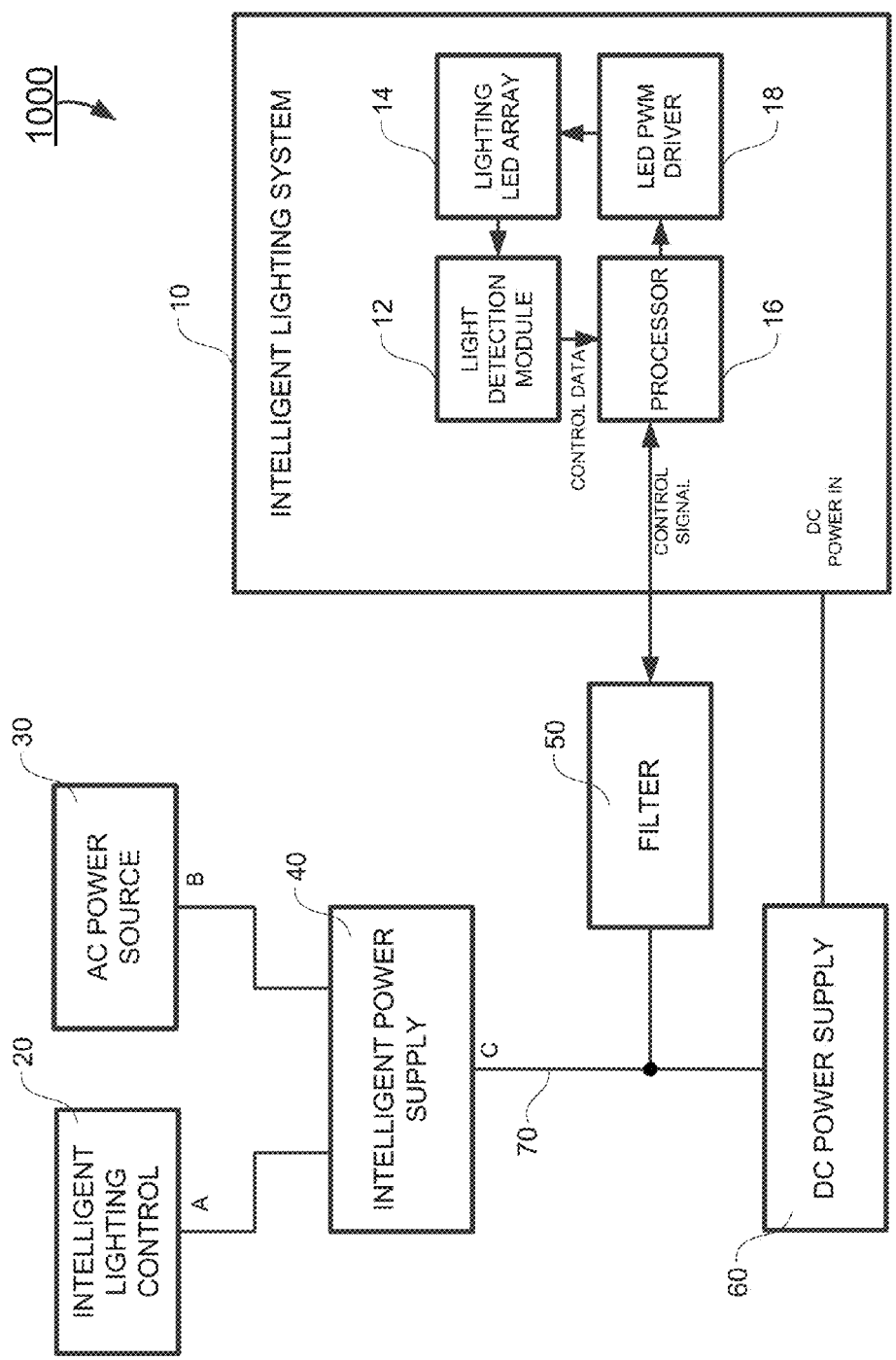
FIG. 1 shows an ambient light control system to control and drive an LED light fixture, detect ambient light intensities, and control the LED lights according to one embodiment of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-12, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Numerous details are set forth to provide a thorough understanding of the present disclosure. Well known methods, techniques, processes, circuits, component parts, structures, or systems obvious to one of the ordinary skill are not further described in detail to avoid unnecessarily obscuring the understanding of the present disclosure. Like numbers refer to like elements throughout.

The principle of the present disclosure is to be able to: (a) use an intelligent lighting control module to control the LED lighting, (b) use an LED or an LED array to detect the level of ambient lighting, and (c) use the level of ambient lighting to control the output of LED lighting to achieve maximum saving of energy and to provide sufficient lighting to ensure the safety and security of the areas the LED lighting is installed.

Reference is now made to FIG. 1 in accordance to one embodiment of the present disclosure. FIG. 1 shows an intelligent lighting control system 1000. The intelligent lighting control system 1000 includes: (a) an intelligent lighting system 10, (b) an intelligent lighting control module 20, (c) an AC power source 30, (d) an intelligent power supply 40, (e) a filter 50, (f) a DC power supply 60, and (g) a CAT-5 cable 70.

The intelligent lighting control module 20 is configured to allow an operator to control the intelligent lighting control system 1000 remotely. It can be used to control the ON/OFF states, the brightness, the group of LED arrays, the color, the temperature, as well as many other functions of the intelligent lighting control system 1000. It can be a desktop or laptop computer, a network accessible handheld device such as an iPhone or an Android mobile phone. The computer or the handheld device also has some application programs installed with a user interface to allow the operator to login to the intelligent lighting control module 20, to operate the control program, and to control the lighting control system 1000 remotely.

In certain embodiments, the intelligent lighting system 10 includes: (a) a lighting LED array 14, (b) a light detection module 12, (c) a processor 16, and (d) an LED pulse-width modulation (PWM) driver 18. The lighting LED array 14 is configured to operate in light emission mode, light detection mode, and data transmission mode. The light detection module 12 is configured to detect the ambient lighting, convert detected ambient lighting to digital data, and send the digital data to the processor 16 for processing. The processor 16 is configured to receive a digital control signal from the intelligent power control, and the digital data representing ambient light from the light detection module. The LED PWM driver 18 is configured to receive control signal from the processor 16 and control the lighting of the lighting LED array 14 according to the control signal from the processor 16.

In one embodiment, the light detection module 12 includes: (a) a first gate control, (b) a second gate control, (c) an operational amplifier, and (d) an analog to digital converter. The operational amplifier of the light detection module 12 is configured to receive photovoltaic voltage generated by the lighting LED array 14 during the lighting LED array 14 light off cycle and when the lighting LED array 14 is operating in light detection mode and amplify the receive photovoltaic voltage as a measurement of ambient light intensity. The analog to digital converter is configured to convert the amplified photovoltaic voltage into digital data. The anode of the lighting LED array 14 is electrically coupled to the first gate control, a power supply, and the processor 16, and the cathode of the lighting LED array 14 is electrically coupled to the second gate control, a ground voltage, and the processor, respectively. The processor 16 controls the switches of the first gate control and the second gate control such that the lighting LED array 14 is arranged to operate in light emission mode, light detection mode and the data transmission mode in a PWM duty cycle. The photovoltaic voltage is detected within a predetermined period of time after the lighting LED array are set to operate in light detection mode and the lighting LED array is not in light emission mode.

In another embodiment, the light detection module 12 includes: (a) a separate light sensor, (b) an operational amplifier, and (c) an analog to digital converter. The operational amplifier is configured to receive the output of the separate light sensor representing the ambient lighting. The analog to digital converter is configured to convert the amplified photovoltaic voltage into digital data, and send the digital data to the processor 16. The output of the separate light sensor is electrically coupled to the input of the operational amplifier, the output of the operational amplifier is electrically coupled to the analog to digital converter, and the output of the analog to digital converter is electrically coupled to the digital data input of the processor, and the processor controls the output of the LED PWM Driver such that the lighting intensity of the lighting LED array is controlled.

Figure 2A:
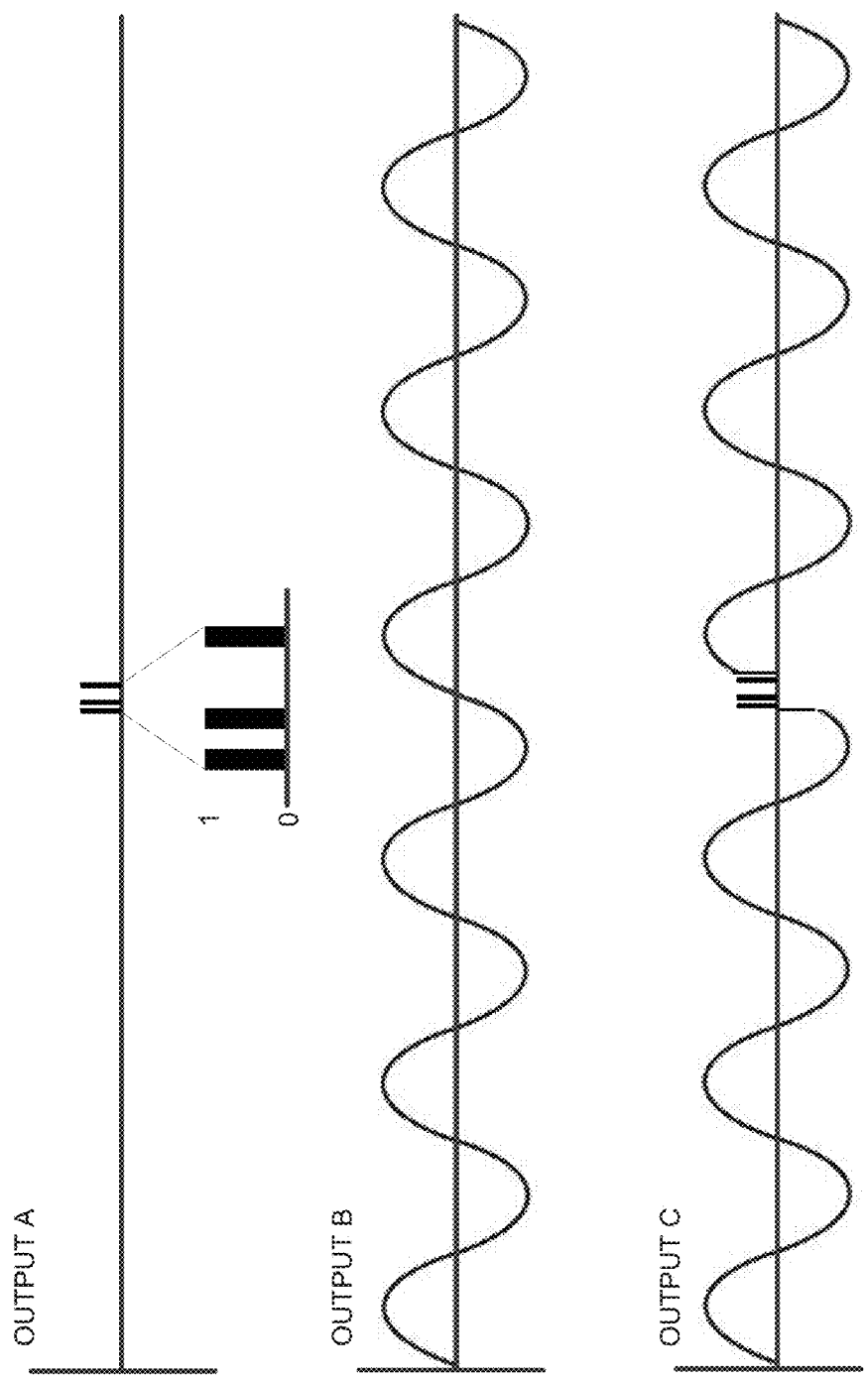
FIG. 2A illustrates a control signal waveform from an Intelligent lighting control system, an AC power supply waveform from an AC power source, and a combined signal waveform output at an intelligent power supply according to embodiment of the present disclosure.

In certain embodiments, the output A of the intelligent lighting control module 20 can be a series of digital signal as shown at the top of FIG. 2A. In other embodiments, the output A of the intelligent lighting control module 20 can be a series of short burst of modulated high frequency analog signal as shown at the top of FIG. 2B. The user interface of the application programs of the intelligent lighting control module 20 is able to accept the instructions from the operator, convert the instructions to digital control signal, and/or further encode the digital signal in a modulated high frequency analog signal.

In certain embodiments, the intelligent lighting control module 20 can also use the control signals to instruct the intelligent power supply 40 how to mix the lighting control signals received from the intelligent lighting control module 20 with the power supply received from the AC power source 30. The function of the intelligent power supply 40 will be described in detail below.

The AC power source 30 is configured to provide the AC power supply to the intelligent lighting system 10 for both the control circuit and the LED lighting. As will be discussed below, in certain embodiments, the power can be transmitted to the intelligent lighting system 10 with CAT-5 cable or other similar data cables, the AC power from a typical AC power source (such as that having a voltage in the range from 100 V to 240 V) can be not directly be used here. The high AC voltage is usually reduced and regulated to 24V or 48V, for example, by using a transformer. In other words, the power supply output from the AC power source 30 is regulated and has a lower voltage. An exemplary AC waveform at output B of the AC power source 30 is shown in both FIG. 2A, and FIG. 2B.

The intelligent power supply 40 is configured to (a) receive control signal from the lighting control module, (b) receive reduced voltage AC power source, (c) mix the control signal received from the intelligent lighting control module 20 and the power supply received from the regulated voltage AC power source 30 and send the mixed signals to the intelligent lighting system 10.

In certain embodiments, the intelligent power supply 40 can be implemented with a switch circuit. For example, the regulated voltage AC power source passes through the switch to the intelligent lighting system 10. When the operator sends any instructions to the intelligent lighting system 10 by perform control on the intelligent lighting control module 20, the switch circuit interrupts the power supply and switches the output of the intelligent power supply to the output of the lighting control module in digital form. The resulting waveform at the output C of the intelligent power supply 40 is shown at the bottom of the FIG. 2A.

In another embodiment, the regulated voltage AC power source normally passes through the switch to the intelligent lighting system 10. When the operator sends any instructions to the intelligent lighting system 10 by perform control on the intelligent lighting control module 20, the control signal in digital form as shown in FIG. 2A is modulated by a modulating circuit at the intelligent lighting control module 20 to be in a modulated high frequency analog signal. Then the switch circuit interrupts the power supply and switches the output of the intelligent power supply to the modulated high frequency analog signal of the intelligent lighting control module 20. The resulting waveform at the output C of the intelligent power supply 40 is shown at the bottom of the FIG. 2B.

In certain embodiments, traditional data cables such as CAT-5 cables are used to transmit power supply and the control signals in the lighting control system 1000. As an example, the CAT-5 cable 70 is used to transmit control signal from the intelligent lighting control module 20, and low voltage AC power supply from the AC power source 30. Unlike regular power wires, the CAT-5 cable 70 is limited to certain voltage and current. Therefore, the AC power source 30 has to reduce the 110V AC power supply to a lower voltage AC power supply such as 24V AC or 48V AC. The CAT-5 cable 70 is made of 24AWG copper wire and the maximum ampere for power transmission is about 0.577 amp each wire.

Figure 3:
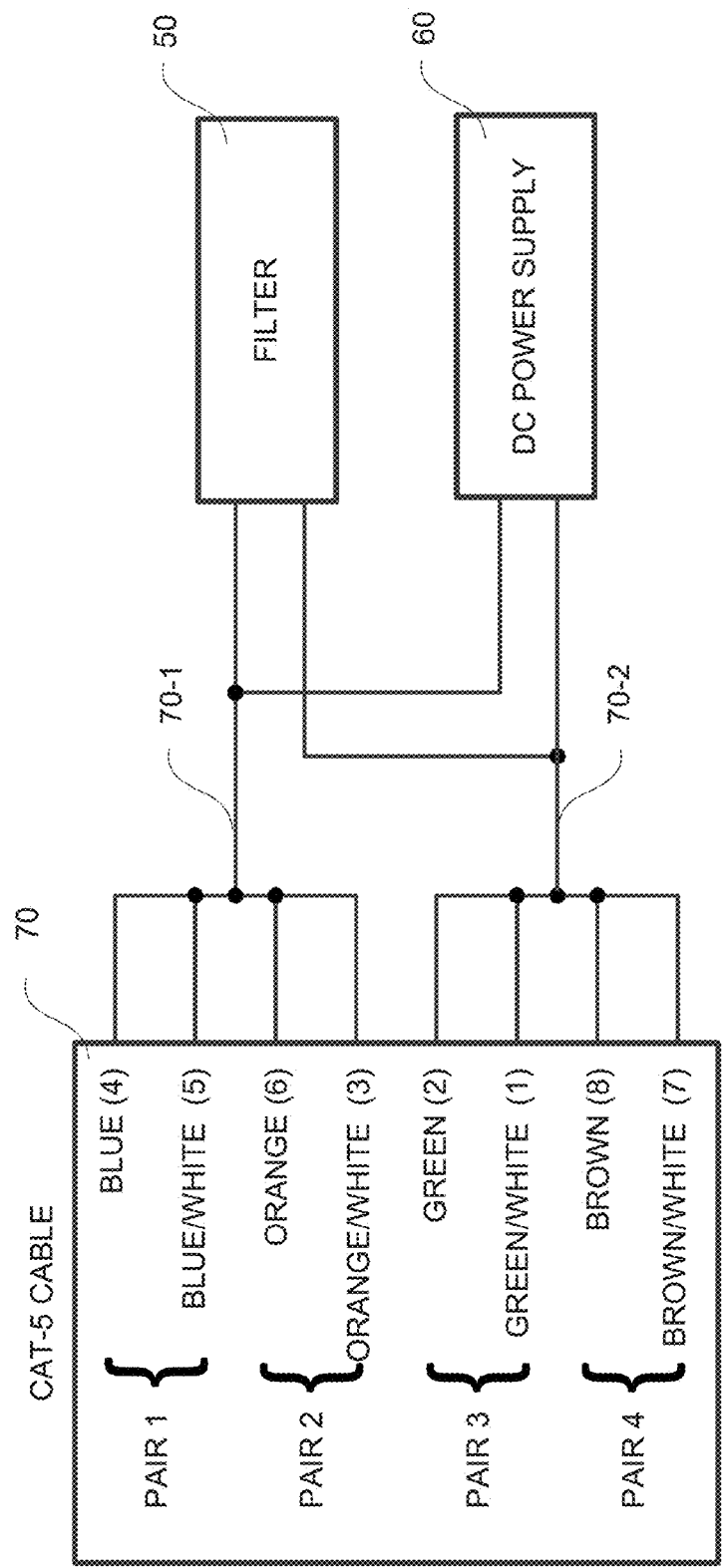
FIG. 3 shows a CAT-5 twisted pair cable used for carrying control signal and AC power supply for the LED light fixture according to one embodiment of the present disclosure.

A data cable can be configured in different manners in order to be utilized to transmit power supply or control signals in the lighting control system 1000. In one configuration, the CAT-5 cable 70 is configured to form two group of wires to transmit AC power with each group having 4 24AWG copper wires. According to the TIA/EIA-568-B.1-2001 T568A wiring scheme, the CAT-5 cable 70 has four twisted pairs of wires: (a) Pair 1: blue (pin 4) and blue/white (pin 5), (b) Pair 2: orange (pin 6) and orange/white (pin 3), (c) Pair 3: green (pin 2) and green/white (pin 1), and (d) Pair 4: brown (pin 8) and brown/white (pin 7). In one embodiment, the Pair 1 and Pair 2 are combined to form a first group 70-1, and the Pair 3 and Pair 4 are combined to form a second group 70-2, as shown in FIG. 3. With such a configuration, each group can carry about 2 ampere electric current.

One of the advantage of using CAT-5 cable 70 as power transmission line is that it provides redundancy. If some wires are cut among the Pair 1 and Pair 2, the first wire 70-1 will still work. If some wires are cut among the Pair 3 and Pair 4, the second wire 70-2 will still work. Additionally, if the insulation layers between the twisted pair are damaged, it will not cause any short circuit between the twisted pairs.

In certain embodiments, electronic devices and components of the intelligent lighting system require direct current (DC). The DC Power Supply 60 is designed to provide DC power supply to the intelligent lighting system 10. The DC Power Supply 60 includes at least a rectifier circuit to convert alternate current (AC) to direct current (DC). The rectifier circuit may be a half wave rectifier circuit, a full wave rectifier circuit, or a bridge rectifier circuit. While half-wave and full-wave rectification can provide unidirectional current, none of them can provide a constant voltage. In order to produce steady DC from a rectified AC supply, a smoothing circuit or a filter is required. In its simplest form this can be just a reservoir capacitor or smoothing capacitor, placed at the DC output of the rectifier. There will still be an AC ripple voltage component at the power supply frequency for a half-wave rectifier, twice that for full-wave, where the voltage is not completely smoothed. In order to yield a smooth, steady, and very low ripple DC voltage, an active voltage regulator circuit may be required to follow the reservoir capacitor.

In certain embodiments, the intelligent lighting system 10 may require multiple different DC power supply voltages. For example, control circuit of the intelligent lighting system 10 may require a DC 5 volt power supply for provide control functions to the intelligent lighting system 10. For a powerful light emitting diode (LED) lighting unit, or an LED array, it may require a different, higher DC voltage to drive a pulse-width modulation (PWM) LED driver to provide sufficient lighting. This higher voltage may be DC 12V, 24 V, or 48 V. Therefore, the DC Power Supply 60 may also include a DC to DC voltage converter. The DC to DC voltage converter includes switching regulators, step-down voltage regulators, single-chip DC/DC converters or many other types of DC to DC voltage convertors.

The filter 50 is designed to separate the high frequency control signals from the combined control signal from the intelligent lighting control module 20 and the regulated voltage AC power source 30. As described earlier, the control signal from the intelligent lighting control module 20 is usually in a relatively high frequency, and the low voltage AC power supply is in a relatively low frequency. Therefore, separating these two signals can be rather simple. For example, a high pass filter can be used to pass the high frequency control signal to the control signal input of the intelligent lighting system. Typically, the high frequency control signal in the combined AC low voltage power supply and the control signal would not cause any negative impact to the DC power supply. Therefore, there is no need to remove the high frequency control signal from the combined AC low voltage power supply and the control signal.

In certain embodiments, the control signal is modulated by a modulating circuit at the intelligent lighting control module 20 to be a modulated high frequency analog signal. When the operator sends any instructions to the intelligent lighting system 10 by perform control on the intelligent lighting control module 20, the switch circuit interrupts the power supply and switches the output of the intelligent power supply to the modulated high frequency analog signal of the intelligent lighting control module 20. In certain embodiments, when receiving control signals from the filter 50, the intelligent lighting system 10 may include a demodulation circuit or decoder to recover the original digital control signal before the digital control signal is sent to a controller of the intelligent lighting system 10.

An LED is a semiconductor light source. Early LEDs emitted low-intensity red light and they are mostly used as indicator lamps in many devices and seven segment numeral display. As new LED technology advances, modern LEDs are available across the visible, ultraviolet, and infrared wavelengths, with very high brightness. The bigger and the brighter LEDs are increasingly used for traffic lights, area lightings and other street lightings as a replacement for the incandescence light bulbs and florescent tubes. LED lights present many advantages over incandescent light sources including lower energy consumption, longer lifetime, improved physical robustness, smaller size, vibration and shock resistance and faster switching.

LEDs are used in applications as diverse as aviation lighting, automotive lighting, advertising, general lighting, and traffic signals. LEDs have allowed new text, video displays, and sensors to be developed, while their high switching rates are also useful in advanced communications technology. Infrared LEDs are also used in the remote control units of many commercial products including televisions, DVD players and other domestic appliances.

To control the light intensity of an LED, the power supplied to the LED can be varied. For example, using a potentiometer (variable resistor), the more power the LED receives the brighter it is, the less power it receives the dimmer it is.

In addition or alternatively, microcontrollers can be used to control the on and off states (e.g., "Power On" and "Power Off") of an LED. Varying the ratio between the "Power On" and "Power Off" states can also achieve the LED light intensity control. If the LED is turned on for 50% and off for 50%, the LED will appear half as bright since the total light output over the time duration is only half as much as 100% on. The important factor here is the duration of each power state. If the LED is turned on and off too slowly, the LED will be perceived as blinking and not a constant light output which appears dimmer. The pulsing width (in this case 50%) is also an important factor here. By varying (or 'modulating') the pulsing width we can effectively control the light output from the LED. Therefore, it is called Pulse Width Modulation (PWM). The PWM provides the ability to 'simulate' varying levels of power by oscillating the output from the microcontroller.

When using PWM it's important to consider how slowly we can 'flash' the LED so that the viewer does not perceive the oscillation. The eye's inability to see rapid oscillations of light is caused by our 'persistence of vision' which means, in very simple terms, we see the light as on even after it has turned off. This technique is how televisions display a seemingly moving picture which is actually made up of a number of different still frames displayed one after the other very rapidly. The minimum speed of an LED oscillating which can be seen by the human eye varies from person to person. However, a minimum speed of 50 Hz, or 50 times per second is commonly used for PWM.

A term "duty-cycle" is frequently used in PWM and it refers to the total amount of time a pulse is 'on' over the duration of the cycle, so at 50% brightness, the duty-cycle of the LED is 50%. The 'cycle' itself is measured usually in Hertz which gives us the cycles-per-second. So at 50 Hz, our cycle is 1 second divided by 50 cycles, which is 0.02 seconds, or a cycle duration of 20,000 microseconds. During the 20,000 microseconds the LED will be turned either on or off depending on the required duty-cycle so, for example, a 75% duty-cycle requires the pulse to be on for 15,000 microseconds and then off for 5,000 microseconds.

The PWM is adopted for the present disclosure and will be discussed in more detail in later sections of the present disclosure.

An LED, or an LED array can also be used for light detection in the light detection mode. The light detection mode utilizes LED's photoelectric effect to produce electrical potential under certain lighting condition. Two typical and common semiconductor components with photoelectric effect are light emitting diodes (LEDs) and Photo Voltaic.

Though LEDs and Photo Voltaic are different in construction, a typical LED designed for light emission when energized will also produce an electric charge across its terminals when illuminated by an external source. The electric charge produced across its terminals is very small and it is not practical to use such LEDs for generating electricity. To product enough light output, LEDs used for illumination in light fixtures are typically connected in series and/or parallel combination so multiple LEDs can be powered from a single power supply. On the other hand, the electric charge accumulated over these combined LED arrays will produce a larger voltage or current when more units are combined.

As discussed above in light emission mode, the PWM method is used. Although the human perception cannot detect it, the LED light or LED arrays is actually switching from completely on to completely off when the PWM cycle is less than 100%. If an LED light fixture is the only light source in a room and there is no other light source present, for some fraction of time, the room is technically completely dark.

During the LED lights off periods of the PWM cycles, LED detection functions can be used at sporadic or fixed intervals throughout the operation of the LED light fixture. Typically, the LED light needs to be completely turned off such that the driving current of the LED array is shut off. It usually takes certain time for the LED light to allow the current to discontinue, the chemistry of the LED light to normalize, and photon emission to seize. Therefore, it is preferable to wait a predetermined time period before the LED light detection function is performed to get reliable reading of the ambient light. If the detected photovoltaic voltage collected across the LEDs as a result of the ambient light on the LED light is weak, an optional operational amplifier may be used to amplify the detected photovoltaic voltage. An Analog To Digital Converter is then used to digitize the collected voltage produced and the collected voltage in digital form is then passed to a processor to determine the ambient light reading. After the measurement the operation continues and the ambient light reading can be used to adjust the required light intensity or report the intensity to a microcontroller of the LED module, a central controller for group control, or transmitted to other fixtures or a master fixture for controlling a multitude of light fixtures.

In addition, an LED or LED arrays can also be used in bidirectional communication. The information is encoded by high speed pulses modulated and controlled by the processor, and the high speed pulses (digital signal) are transmitted to the LED module. The digital signal can be transmitted both during the LED on cycle and the LED off cycle. In one embodiment, at the receiving end, another similar LED with light detection capability is used and configured to (a) detect the digital signal sent by the source LED, (b) decode the digital signal detected, and (c) send the digital signal to the processor. In another embodiment, at the receiving end, an external light sensors as well as associated circuit can be used to perform the same functions: (a) detect the digital signal sent by the source LED, (b) decode the digital signal detected, and (c) send the digital signal to the processor. A group of LED arrays can be managed, controlled and synchronized by using LED's data transmission mode. Infrared LEDs in the remote control units of many commercial products are good examples of data transmission mode for control of televisions, DVD players and other domestic appliances.

Figure 4:
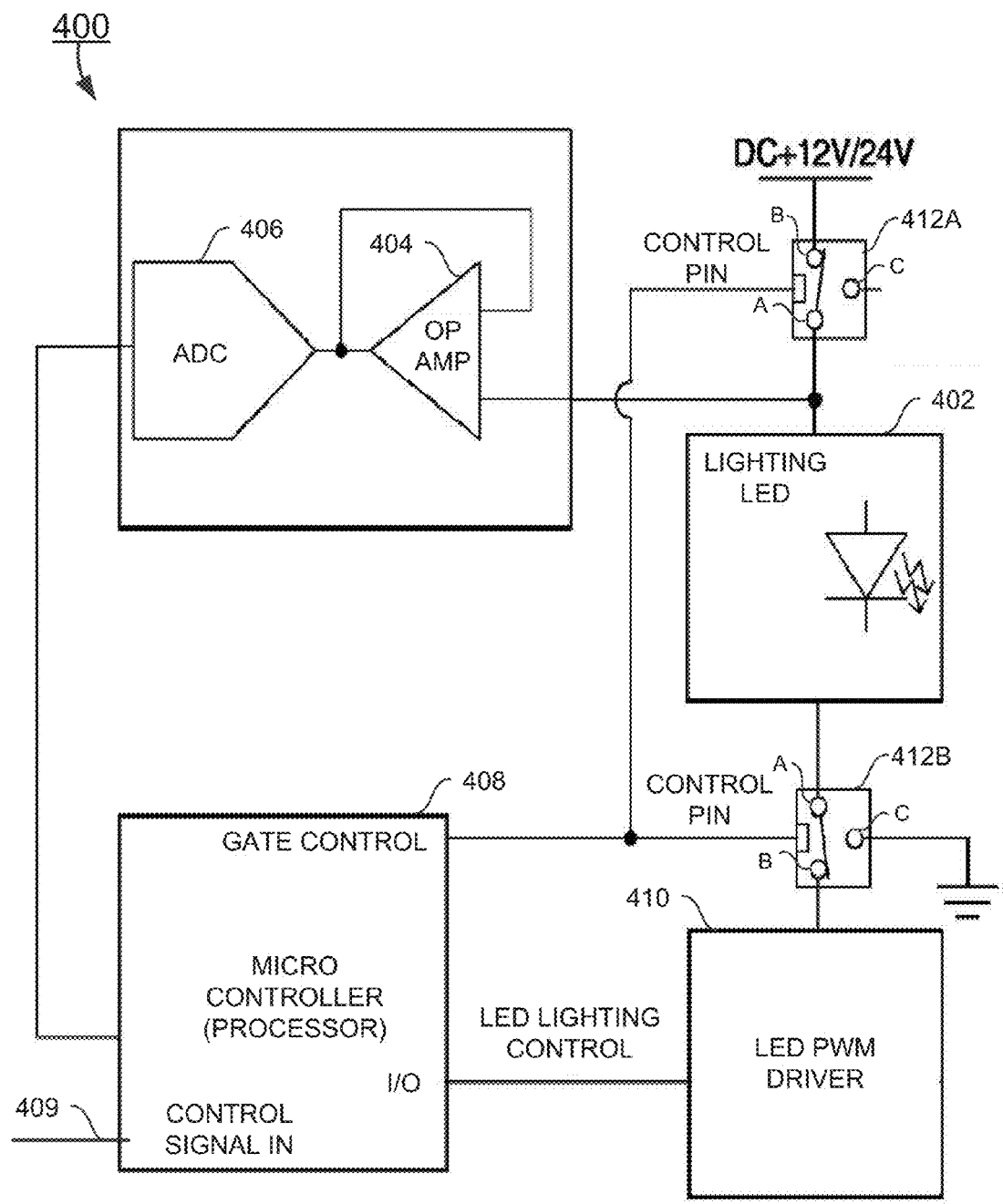
FIG. 4 shows an intelligent lighting system 400 having an LED light fixture, light fixture control and ambient light detection functionalities according to one embodiment of the present invention.

Referring now to FIG. 4, an intelligent lighting system 400 having an LED light fixture, light fixture control and ambient light detection functionalities is shown according to one embodiment of the present invention.

In certain embodiments, the intelligent lighting system 400 includes, a lighting LED 402, a switching device 412A coupled to the anode of the lighting LED 402, a switching device 412B coupled to the cathode of the lighting LED 402, an operational amplifier (OP AMP) 404 coupled to the anode of the lighting LED 402, an analog to digital controller (ADC) 406 coupled to the OP AMP 404 for sampling the ambient light photovoltaic voltages generated by the lighting LED 402, a processor 408 coupled to ADC 406 for analyzing the sampled ambient light photovoltaic voltages and determining the ambient light intensity accordingly, an LED power width modulation (PWM) driver 410 for adjusting the illumination of the lighting LED 402, and a power supply to provide power source. The processor 408 can be a central processor unit, a micro-controller or a single-chip microprocessor. The LED PWM Driver 410 can be a constant current circuit controller.

In certain embodiments, as a specific example, the anode of the lighting LED 402 may optionally couple to a node A of a first switching device 412A and the cathode of the lighting LED 402 may optionally couple to a node A of a second switching device 412B. The first switching device 412A is coupled to a power source (via node B), a floating voltage (via node C), the anode of the lighting LED 402 (via node A), and the gate control pin (via control pin node) of the processor 408. The processor 408 controls the switch of the first switching device 412A and the second switching device 412B synchronously. The second switching device 412B is coupled to the LED PWM Driver 410 (via node B), a ground voltage (via node C), the cathode of the lighting LED 402 (via node A), and the gate control of the processor 410 (via the control pin). The processor 408 controls the switch of second switching device 412B. The processor 408 controls the lighting LED 402 to operate as a light emitter in the light emission mode or as an ambient light sensor in the light detection mode via controlling the switches of the first switching device 412A and the second switching device 412B. The control of the switches of the first switching device 412A and the second switching device 412B is synchronized by the gate control of the processor 408.

In certain embodiments, in order to operate the lighting LED 402 in a light emission mode, the processor 408 controls each of the switching device to open a conducting channel between node A and node B. The lighting LED 402, when operating in the light emission mode, may be controlled by the LED PWM Driver 410 or a constant current circuit, to regulate LED's emission intensity.

In order to operate the lighting LED 402 in a light detection mode, the processor 408 controls each of the switching device to open a conducting channel between node A and node C. In certain embodiments, in order not to interfere with the controlled LED emission intensity, a light detection mode is only used during the time period when the LED light is turned off. When the lighting LED 402 is operating in light detection mode, the lighting LED 402 is also supposedly turned off by the LED PWM Driver 410. The lighting LED 402 may generate a photovoltaic voltage when exposed to ambient light. The voltage generated by the lighting LED 402 is proportional to the brightness of the ambient light. The waveform generally rises rapidly within the first 25 µs (microsecond) period. The ascension continues for the next 50 µs, however, is unstable. The waveform shows signs of stability approximately between 75 µs to 100 µs. Hence, the ambient light photovoltaic voltage would take more than 75~100 µs to become stable after the LED is turned off and exposed to ambient lights.

A single LED when operating as a light sensor may be exposed to potential unwanted noise, thus generating unreliable ambient light photovoltaic voltage. Multiple LEDs, when operating as light sensors, may be coupled in parallel to reduce the impact of the unwanted noise thus improving the reliability of ambient light detection. The multiple LEDs may also be coupled in series to increase the detected ambient light photovoltaic voltage thus improving the discernibility of the various waveform slopes when operating as a light sensor. In one embodiment of the present disclosure, the lighting LED 402 can be a LED array including multiple light-emitting diodes coupled in series-parallel to operate as light emitters and light sensors.

In addition to unwanted noise, when the lighting LED 402 is turned on and off by the LED PWM Driver 410, residual currents/voltages may remain due to the parasitic capacitance of the lighting LED 402. The residual currents and voltage may affect the reliability of photovoltaic ambient light voltages detected by the lighting LED 402.

When the lighting LED 402 is operating in light emission mode, a DC power supply is directly connected to the anode of the lighting LED 402, and the LED PWM Driver 410 is directly connected to the cathode of the lighting LED 402 to cause the lighting LED 402 to illuminate. When the lighting LED 402 is operating in light detection mode, the anode of the lighting LED 402 is connected to a floating voltage, and the cathode of the lighting LED 402 is connected to the ground voltage such that the photovoltaic voltage is generated across the anode and cathode of the lighting LED 402 and applied to the input terminal of the OP AMP 404. Accordingly, the switch of the first switching device 412A and the second switching device 412B will improve the discernibility of the various ambient light photovoltaic voltages generated by the lighting LED 402.

The anode of the lighting LED 402 may be electrically coupled to the OP AMP 404 to further enhance the discernibility of ambient light photovoltaic voltage waveform generated by the lighting LED 402. The amplified ambient light photovoltaic voltage waveform is then detected and sampled by the analog to digital converter (ADC) 406. It is known in the art that if ADC 406 becomes more sensitive or that if the lighting LED 402 becomes more sensitive to ambient lights, the application of OP AMP 404 may not be necessary.

After ADC 406 detects and samples ambient light photovoltaic voltage waveforms, the sampled voltages are submitted to processor 408. The processor 408 may compare the sampled ambient light photovoltaic voltage waveforms with a reference table and determine the ambient light intensities. The processor 408 further controls the LED PWM Driver 410 to adjust the illumination of LED illumination system 400 according to the determined ambient light intensities.

In addition to using one LED for both providing lighting, and detecting ambient lighting, an LED can be used to provide lighting and a separate light sensor can be used to detect ambient lighting. Such circuit may have certain advantages: such as having higher light sensitivity, providing precise and easier lighting control. However, it does require additional components and circuits to perform the same function as one LED or an array of LEDs as shown in FIG. 4.

Figure 5:
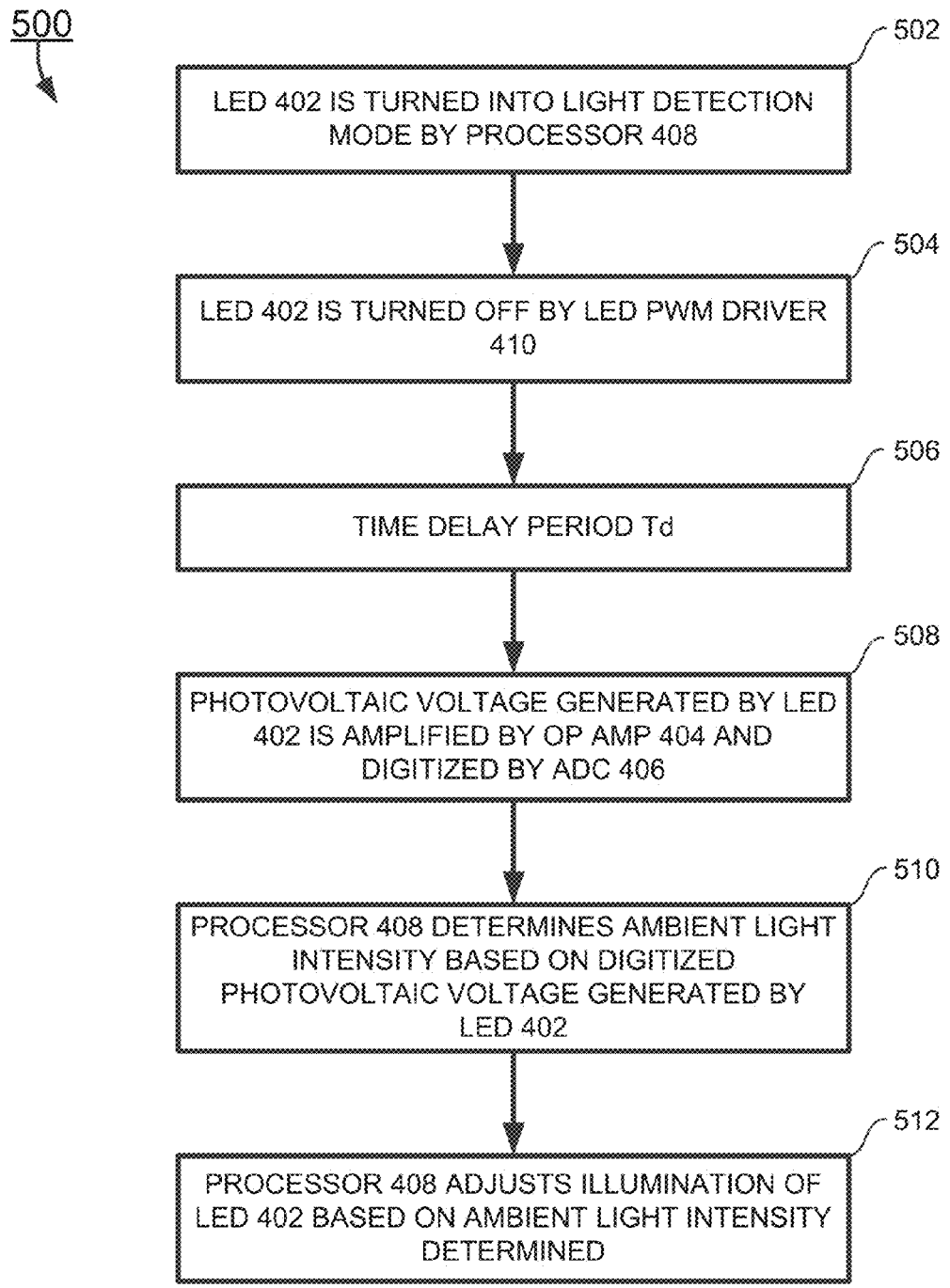
FIG. 5 shows a flow chart for determining the ambient light intensity according to an embodiment of the present disclosure.

FIG. 5 shows a flow chart 500 for determining the ambient light intensity according to an embodiment of the present disclosure.

At operation 502, the ambient light detection mode of the lighting LED 402 is initiated when the processor 408 controls the switches of the first switching device 412A and the second switching device 412B such that the cathode of the lighting LED 402 is connected to a ground voltage and the anode of the lighting LED 402 is kept floating as shown in.

At operation 504, the ambient light detection mode of the lighting LED 402 may be initiated before or after the LED is turned off by the LED PWM driver 410. The gate control of the processor 408 controls the switches of the first switching device 412A and the second switching device 412B, such that the cathode of the lighting LED 402 is connected to a ground voltage and the anode of the lighting LED 402 is kept floating.

At operation 506, after the gate control is switched, the ambient light detection procedure may be optionally delayed by a delay period t for the lighting LED 402 to discharge all residual currents and thereafter, to generate ambient light photovoltaic voltage waveform. When a different LED is applied, the delay period $T_d$ may be modified in accordance with the characteristic of the LED.

At operation 508, after the delay period $T_d$, the ambient light photovoltaic voltage generated by the lighting LED 402 is amplified by the operational amplifier 404 and digitized by the ADC 406. The ADC 406 may continue to sample for a sampling period t' and submit the sampled voltages to the processor 408. It is preferable for the sampling period t' to be shorter than 24 ms given the persistence of human vision retention.

At operation 510, the processor 408 determines the ambient light intensity based on the sampled ambient light photovoltaic voltage received.

At operation 512, the processor 408 adjusts the illumination of the intelligent lighting system 400 based on the determined ambient light intensity. More specifically, the processor 408 switches the lighting LED 402 to light emission mode via the first switching device 412A and the second switching device 412B, and instructs the LED PWM driver 410 to turn on the lighting LED 402 according to the determined ambient light intensity.

According to another embodiment of the disclosure, the ambient light intensity may be determined by the processor 408 in operation 512 by taking the average of the ambient light photovoltaic voltages digitized in operation 508.

Alternatively, processor 408 may first store the ambient light photovoltaic voltages digitized by ADC 406 within the sampling period t', repeat the sampling procedure continually, and store the sampled results for a number of LED-off cycles. Taking average of the sampled results, the processor 408 would then determine the ambient light intensity accordingly. This alternative aids in reducing the impact of some instant noise.

Figure 6A:
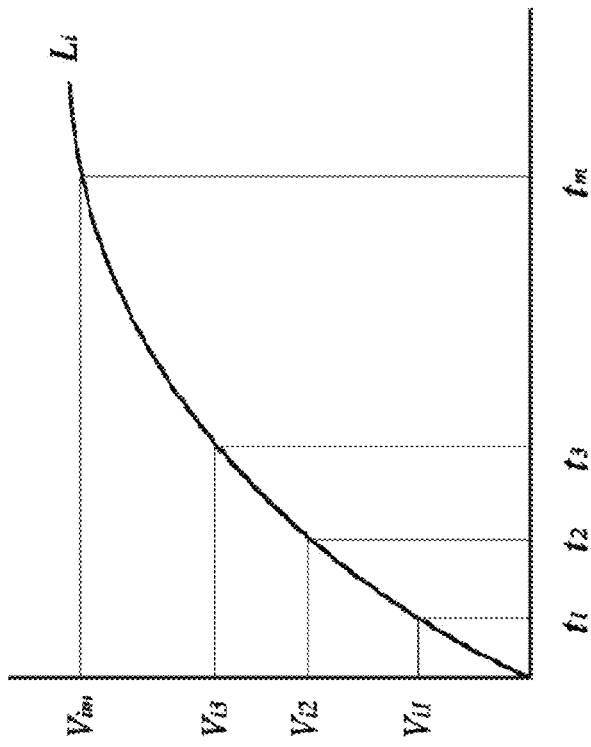
FIG. 6A shows an ambient light photovoltaic voltage waveform caused by a ambient light intensity Li, and a reference table in responding to the Li.

According to another embodiment of the disclosure with reference to the reference table of FIG. 6A, the lighting LED 402 may initially be exposed to different reference light intensities L1, L2, L3 ... Ln to generate the corresponding ambient light photovoltaic reference vectors R1, R2, R3 ... Ri ... Rn of a reference vector table. As shown in the ambient light photovoltaic voltage waveform in FIG. 6A, each light intensity Li should have one corresponding photovoltaic ambient light voltage waveform generated by the lighting LED 402. The corresponding waveform is then digitized by the ADC 406 for m times, within a predetermined sampling period t', as a series of digitized voltage $V_{im}$. The digitized voltages are stored as the reference vector $R_i$, i.e., $R_i=[V_{i1}, V_{i2}, V_{i3} \ldots V_{im}]$, for building a vector table R.

Figure 6B:
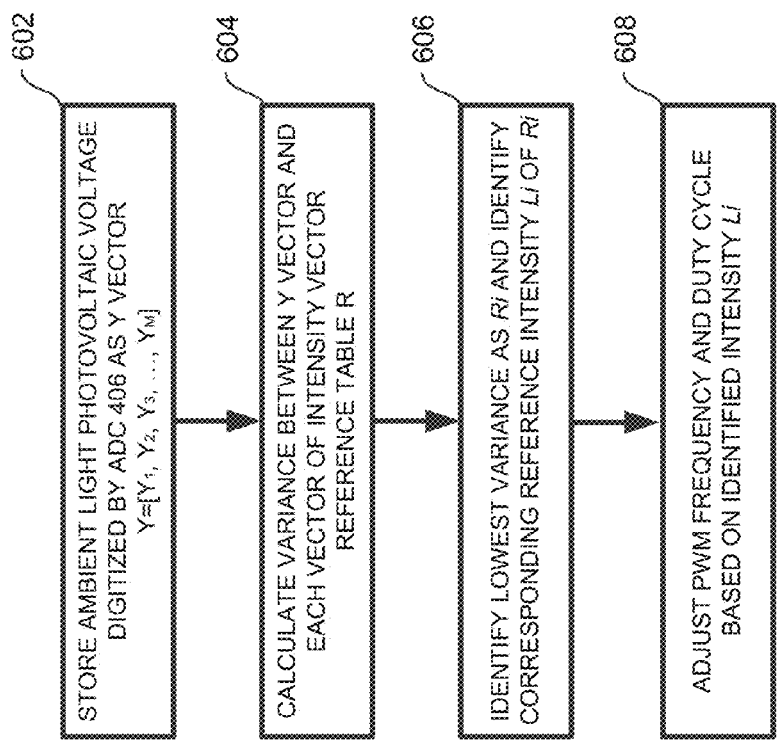
FIG. 6B shows an ambient light photovoltaic voltage waveform caused by an ambient light intensity, and a flow chart of another algorithm for determining the ambient light intensity according to one embodiment of the present invention.
Figure 6B:
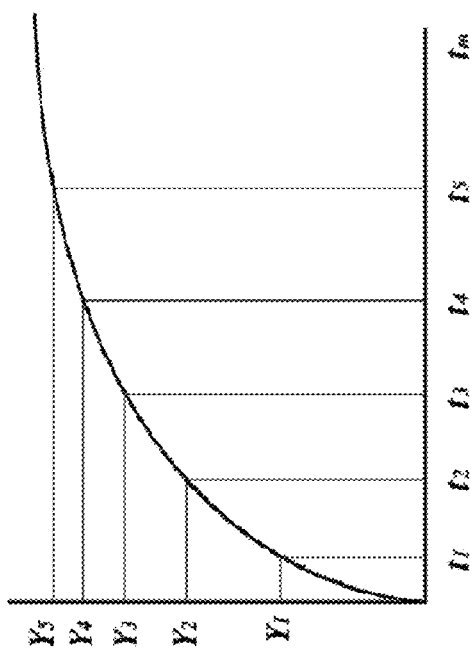

FIG. 6B shows the sampled ambient light photovoltaic voltages of intelligent lighting system 400 exposed to unknown ambient lights, and a flow chart of another algorithm for determining the ambient light intensity according to one embodiment of the present invention. The processor 408 stores the ambient light photovoltaic voltages digitized by ADC 406 as a Y vector, $Y=[Y_1, Y_2 \ldots Y_m]$, as shown in operation 602 of the flow chart in FIG. 6B.

At operation 604, the processor 408 calculates the variance between Y vector and each vector of the intensity reference vector table R.

At operation 606, the processor 408 then identifies which vector of the reference vector table R results in the lowest variance as $R_i$, identifies the corresponding reference intensity $L_i$ of $R_i$.

At operation 608, the processor 408 adjusts the PWM frequency and duty cycle of the LED PWM Driver 410 based on the identified intensity $L_i$.

Figure 7:
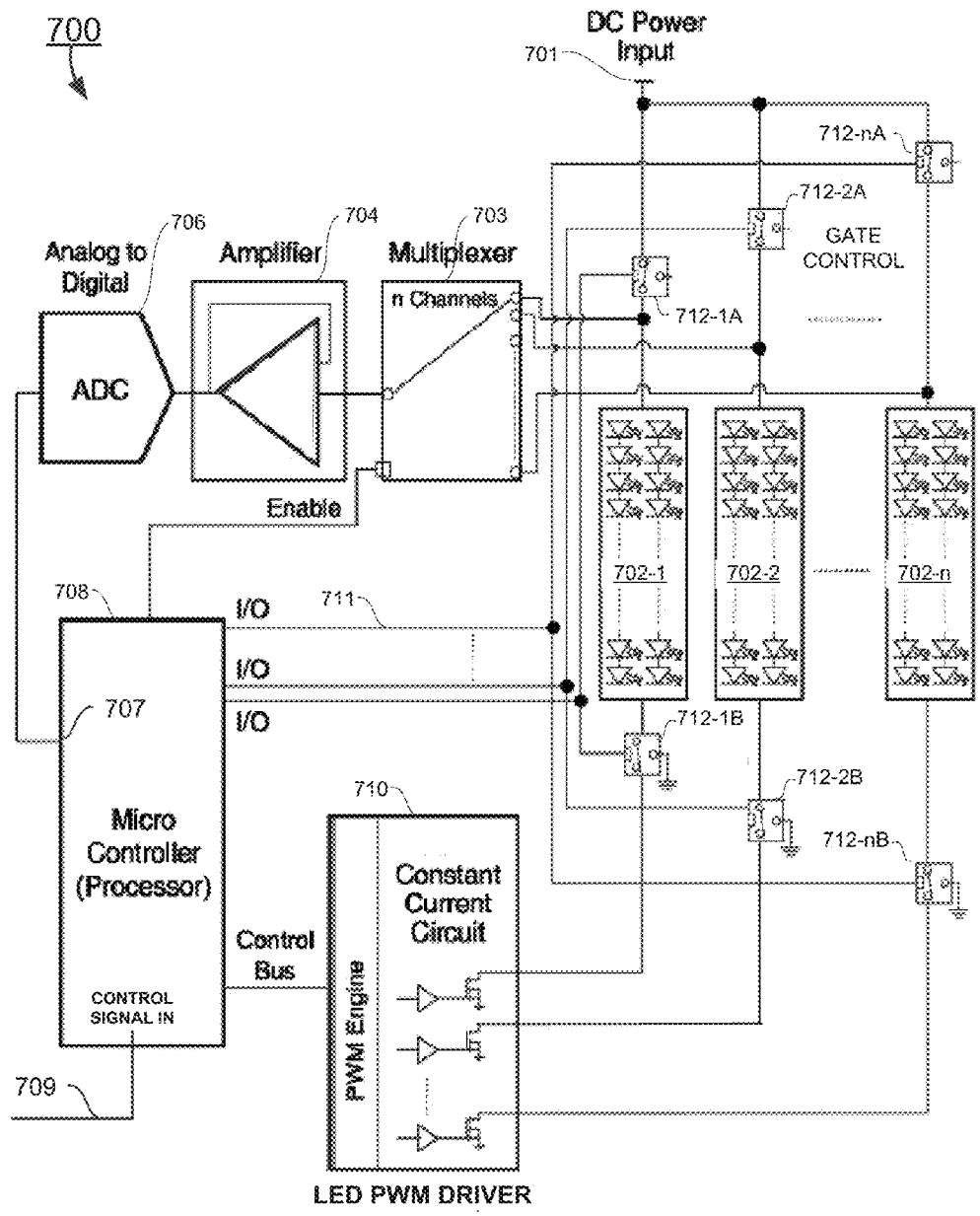
FIG. 7 shows an intelligent lighting system 700 having an LED array light fixture, light fixture control and ambient light detection functionalities according to one embodiment of the present invention.

Referring now to FIG. 7, an intelligent lighting system 700 having an LED array light fixture, light fixture control and ambient light detection functionalities is shown according to one embodiment of the present invention. Three LED arrays of the multiple LED array intelligent lighting system 700 are shown here for illustrative purpose. But the number of LED arrays is not limited by the numbers of the LED array shown in this example. It is known to the art that more than three LED arrays may be adopted without departing from the scope of this disclosure.

In certain embodiments, the multiple LED array intelligent lighting system 700 includes n sets of lighting LED arrays 702-1, 702-2, ..., and 702-n, a first set of switching devices 712-1A, 712-2A, ..., and 712-nA, a second set of switching devices 712-1B, 712-2B, ..., and 712-nB, a DC power Input 701, a n channel Multiplexer 703, an operational amplifier 704, an analog to digital converter 706, a microcontroller (processor) 708, and an LED PWM Driver 710. The first set of switching devices 712-1A, 712-2A, ..., and 712-nA, and the second set of switching devices 712-1B, 712-2B, ..., and 712-nB are used to synchronize the switching between the light emission mode and the light detection mode of the n sets of lighting LED arrays 702-1, 702-2, ..., and 702-n. The DC power input 701 provides the DC power supply to the entire multiple LED array intelligent lighting system 700, including the LED lighting and the control circuit. In certain embodiments, the DC power Input 701 may provide multiple DC voltages: one lower DC voltage to provide power supply to the control circuit, and a higher DC voltage to drive the LED PWM driver 710 when higher brightness and large number of lighting LED arrays are needed. The n channel multiplexer 703 is used to switch between the output of the photovoltaic voltage of the n sets of lighting LED arrays 702-1, 702-2, ..., and 702-n when they are in the light detection mode.

In certain embodiments, the first, the second, ..., and the n-th inputs of the multiplexer 703, are respectively connected to the anodes of the lighting LED arrays 702-1, 702-2, ..., and 702-n, while the lighting LED arrays 702-1, 702-2, ..., and 702-n are in light detection mode. The cathodes of the lighting LED arrays 702-1, 702-2, ..., and 702-n are connected to the ground voltage. The sequential openings of the n inputs of the multiplexer 703 allow the photovoltaic voltages detected by the lighting LED arrays 702-1, 702-2, ..., and 702-n to be sequentially feed to the operational amplifier 704 for amplifications.

The input of the operational amplifier 704 as shown in FIG. 7 is coupled to the output of the multiplexer 703 to amplify the ambient light photovoltaic voltages generated by the lighting LED arrays 702-1, 702-2, ..., and 702-n. It may be optional, and if the detected output of the photovoltaic voltage of the n sets of lighting LED arrays is strong enough, the operational amplifier 704 may not be needed. The analog to digital converter 706 is used to digitize the output of the operational amplifier 704, to measure the ambient light intensities and send the digitized output of the operational amplifier 704 to the processor 708. The processor 708 has a digital input 707 from the analog to digital converter 706, a control signal input 709 to receive control signal from the intelligent lighting control module 20, a control bus to the LED PWM driver 710 to control the duty cycle of the n sets of lighting LED arrays 702-1, 702-2, ..., and 702-n, and an Input/Output bus 711 having n wires controlling the first set of switching devices 712-1A, 712-2A, ..., and 712-nA, and the second set of switching devices 712-1B, 712-2B, ..., and 712-nB, respectively. The LED PWM driver 710 is used to receive duty cycle control from the processor 708, to adjust the duty cycle of the lighting LED arrays, and provide lighting through the n sets of lighting LED arrays 702-1, 702-2, ..., and 702-n when the n sets of lighting LED arrays are operating in light emission mode.

In addition to provide lighting, the n sets of lighting LED arrays 702-1, 702-2, ..., and 702-n are also used to detect the ambient light intensities. In certain embodiments, the first set of switching devices 712-1A, 712-2A, ..., and 712-nA, is electronically coupled to the anodes of the LED arrays 702-1, 702-2, ..., and 702-n, respectively. The second set of switching devices 712-1B, 712-2B, ..., and 712-nB, is electronically coupled to the cathodes of the LED arrays 702-1, 702-2, ..., and 702-n, respectively. The first set of switching devices 712-1A, 712-2A, ..., and 712-nA are also coupled to a DC power input, a floating voltage, and the gate control output of the processor 708 which controls the switches of the first set of switching devices 712-1A, 712-2A, ..., and 712-nA, respectively. The second set of switching devices 712-1B, 712-2B, ..., and 712-nB are also coupled to a channel of PWM LED driver 710, a ground voltage, and the gate control output of the processor 708 which controls the switches of the second set of switching devices 712-1B, 712-2B, ..., and 712-nB, respectively. In addition, the switches of first set of switching devices 712-1A, 712-2A, ..., and 712-nA and the second set of switching devices 712-1B, 712-2B, ..., and 712-nB also control the function of the lighting LED arrays 702-1, 702-2, ..., and 702-n to operate in either light emission mode or light detection mode.

The lighting LED arrays 702-1, 702-2, ..., and 702-n individually serves as ambient light sensor and light emitter. For the similar reason discussed above, the lighting LED arrays 702-1, 702-2, ..., and 702-n are preferably coupled in series-parallel to improve the ambient light sensitivity and to reduce the impact of unwanted noises.

When LEDs are coupled in series-parallel as a LED array, the overall parasitic capacitance may be increased due to the series-parallel coupling, and the increased parasitic capacitance would affect the LED ambient light sensitivity. More specifically, rising pattern of the slope of the detected ambient light photovoltaic voltage waveform moderates due to the increased parasitic capacitance.

Similar to the function of switching device 412A and 412B, the first set of switching devices 712-1A, 712-2A, ..., and 712-nA and the second set of switching devices 712-1B, 712-2B, ..., and 712-nB are used to disconnect the anodes of lighting LED arrays 702-1, 702-2, ..., 702-n from the LED PWM driver 710 while the cathodes of the lighting LED arrays 702-1, 702-2, ..., 702-n are electrically connected to the ground voltage when lighting LED arrays 702-1, 702-2, ..., 702-n are operating in light detection mode as ambient light sensors. When the cathodes of the lighting LED arrays 702-1, 702-2, ..., 702-n are electrically connected to the ground voltage, residual voltage from the parasitic LED capacitance is released quickly. When the lighting LED arrays 702-1, 702-2, ..., 702-n is electrically disconnected from the LED PWM driver 710, the overall parasitic capacitance may be reduced, and the ambient light sensitivity of the lighting LED arrays is improved.

In addition to the circuit shown in FIG. 7, a separate light sensor or an array of light sensors can be used to perform the light sensing function of the LED arrays 702-1, 702-2, ..., 702-n, and achieve similar lighting control. In this case, the multiplexer 703, the first set of switching devices 712-1A, 712-2A, ..., and 712-nA and the second set of switching devices 712-1B, 712-2B, ..., and 712-nB may be eliminated. Such circuit may have certain advantages: such as having higher light sensitivity, providing precise and easier lighting control. On the other hand, this circuit requires less components and simpler circuit to perform the same function the arrays of LEDs as shown in FIG. 7.

Figure 8:
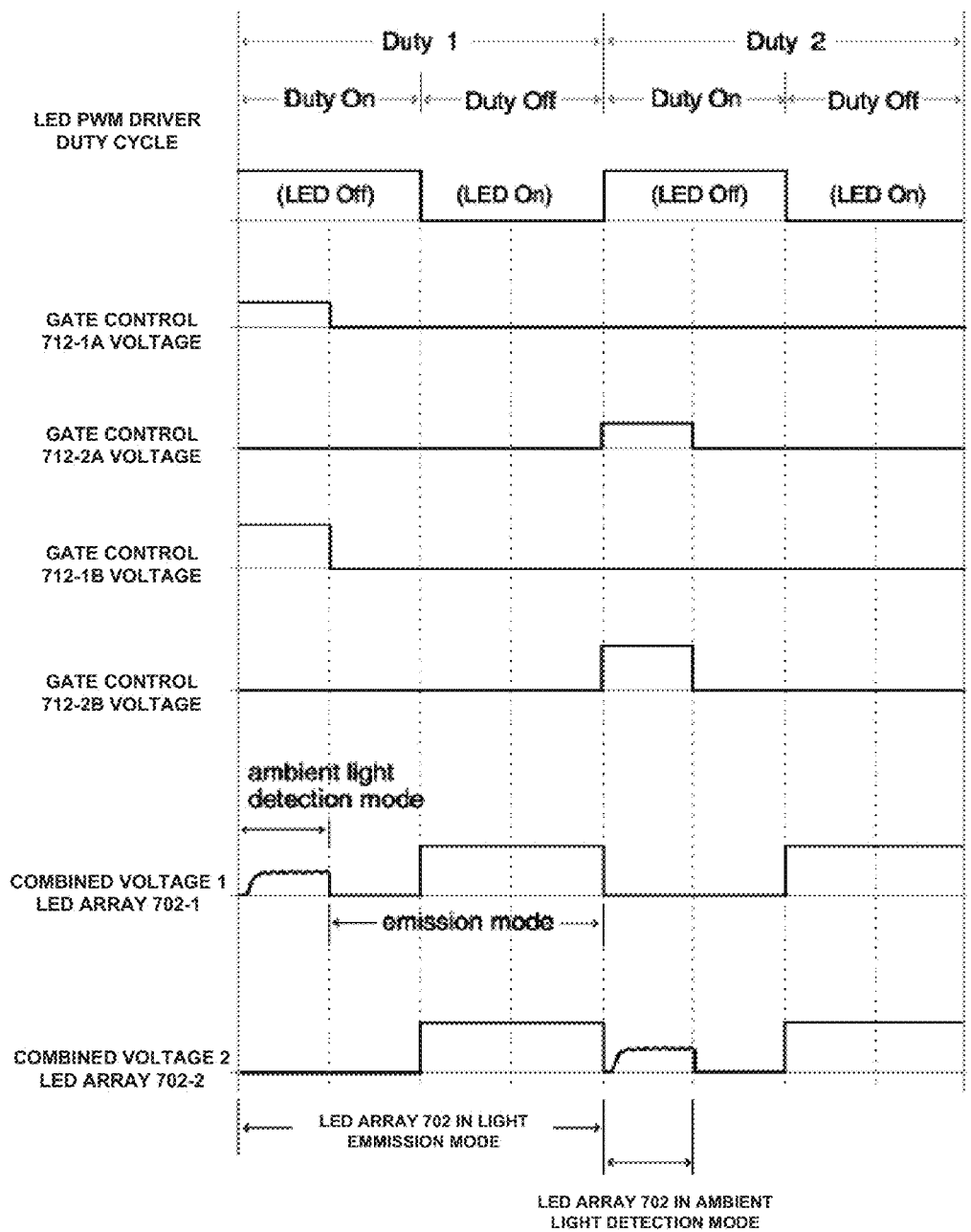
FIG. 8 displays the different waveforms at various location of the LED light fixture with light fixture control and ambient light detection shown in FIG. 7 according to one embodiment of the present invention.

FIG. 8 shows amplified voltage waveforms relating to the multiple LED array intelligent lighting system 700 and ambient light detection, according to one embodiment of the present disclosure. It should be noted that the frequency and the pulse widths of the waveforms are not shown to scale for ease of illustration. The PWM waveforms in FIG. 8 indicates the on and off driving voltage of the LED PWM driver 710 in each duty cycle. The lighting LED array 702-1 and lighting LED array 702-2 are switched on when the LED PWM Driver 710 is in the duty-off state in sequence, i.e., the first lighting LED array 702-1 and the second lighting LED array 702-2 are switched on in the LED duty off cycle. Both lighting LED array 702-1 and lighting LED array 702-2 are switched off during the LED duty on cycle.

When the first lighting LED array 702-1 is switched off by the LED PWM Driver 710, the processor 708 initiates the ambient light detection mode by controlling the switches of first switching device 712-1A of the first set of switching devices and the second switching device 712-1B of the first set of switching devices. Meanwhile, the processor 708 also controls the n channel multiplexer 703 such that the operational amplifier 704 is coupled to the first lighting LED array 702-1. When the second lighting LED array 702-2 is switched off by the LED PWM Driver 710, the processor 708 initiates the ambient light detection mode by controlling the switches of first switching device 712-2A of the second set of switching devices and the second switching device 712-2B of the second set of switching devices. Meanwhile, the processor 708 also controls the n channel multiplexer 703 such that the operational amplifier 704 is coupled to the second lighting LED array 702-2.

In ambient light detection mode, the first switching device 712-1A is switched off (gate voltage high) to disconnect the lighting LED array 702-1 from the power source and to connect the anode of the first lighting LED array 702-1 to a floating voltage. Also, the second switching device 712-1B of the first set of switching devices is switched off (gate voltage high) to disconnect the first lighting LED array 702-1 from the LED PWM Driver 710 and to connect the cathode of the first lighting LED array 702-1 with the ground voltage. More specifically, in ambient light detection mode, the cathode of the first lighting LED array 702-1 is electrically connected to the ground voltage at its cathode and the first input of the n channel multiplexer and the input of the operational amplifier 704 at its anode. The ambient light photovoltaic voltage 1 generated by the first lighting LED array 702-1 rises when it is exposed to ambient lights in ambient light detection mode.

Upon completion of the ambient light detection process, the processor 708 switches the function of the first lighting LED array 702-1 to light emission mode by utilizing the gate controls (gate voltage low). The ambient light photovoltaic voltage 1 generated by the first lighting LED array 702-1 will then drop sharply since the LED PWM Driver 710 will re-control the light emission function of the first lighting LED array 702-1 as shown in combined voltage 1 of the first lighting LED array 702-1 in FIG. 8. Subsequently, the first lighting LED array 702-1 emits light in accordance with its duty cycle and frequency determined by the LED PWM Driver 710.

Similar to the first lighting LED array 702-1, the second lighting LED array 702-2 initially emits in accordance with frequency and duty cycle determined by the LED PWM Driver 710 in the first duty cycle. When the second lighting LED array 702-2 is switched off in the second duty cycle, the processor 708 may initiate the ambient light detection mode by switching the first switching device 712-2A of the second set of switching devices and the second switching device 712-2B of the second set of switching devices to change the function of the second lighting LED array 702-2 to ambient light sensor. Processor 708 also controls multiplexer 703 such that the amplifier is coupled to the second lighting LED array 702-2.

When the second lighting LED array 702-2 is in ambient light detection mode, the first switching device 712-2A of the second set of switching devices is switched off to disconnect the second lighting LED array 702-2 from the power source and to connect the anode of the second lighting LED array 702-2 to a floating voltage. Also, the second switching device 712-2B of the second set of switching devices is switched off to disconnect the second lighting LED array 702-2 from the LED PWM Driver 710 and to connect the cathode of the second lighting LED array 702-2 with a ground voltage. More specifically, in ambient light detection mode, the cathode of the second lighting LED array 702-2 is electrically connected to the ground, and the anode of the second lighting LED array 702-2 is floating, electrically disconnected from the power source, and electrically connected to the second input of the n channel multiplexer 703. Ambient light photovoltaic voltage 2 as generated by the second lighting LED array 702-2 rises when the second lighting LED array 702-2 is exposed to ambient lights in ambient light detection mode.

Upon completion of the ambient light detection process, the processor 708 switches the function of the second lighting LED array 702-2 to light emission mode by utilizing the gate controls (gate voltage low). The ambient light photovoltaic voltage 2 generated by the second lighting LED array 702-2 will then drop sharply since the LED PWM Driver 710 will re-control the light emission function of the second lighting LED array 702-2 as shown in combined voltage 2 of the second lighting LED array 702-2 in FIG. 8. Subsequently, the second lighting LED array 702-2 emits light in accordance with duty cycle and frequency determined by the LED PWM Driver 710.

In one embodiment of the present disclosure, the processor 708, by switching gate controls, may change the function of a LED array from ambient light detection mode to light emission mode within one PWM duty cycle. No changes should be made to the frequency or duty cycles of the LED PWM Driver 710 in ambient light detection mode. Accordingly, the ambient light intensities can be continually detected and sampled for several PWM duty cycles. The sampled ambient light intensities are averaged to improve reliability. Since the ambient light photovoltaic voltages can be sampled within one PWM duty cycle, the flickering of the LED from the ambient light detection process is undetectable to the human eyes.

When multiple LED arrays are adopted as light emitters and ambient light sensors, light emitted by neighboring LED arrays may be detected in the light detecting process as ambient lights, if the duty cycles of these multiple LED arrays are not synchronized. Therefore, in order to detect the ambient light accurately, it is important to synchronize all lighting LED arrays such that all lighting LED arrays are off during the light detection period. In one embodiment of the present disclosure, the PWM duty cycle of the multiple LED array intelligent lighting system 700 is synchronized such that the multiple LED arrays are turned on and off at the same time. Since the duration of the LED off period is shorter than the duration of human vision retention, human eyes cannot detect the off period of the illumination system when the LED arrays are operating as ambient light sensors. Furthermore, no lights emitted by the other LED arrays would affect the ambient lights detected by any of the LED arrays of the multiple LED array intelligent lighting system 700. An advantage of the ambient light detection mechanism of the present disclosure is that the PWM illumination duty cycle does not need to be suspended when the LED arrays function as ambient light sensors.

In one embodiment, when more than one intelligent lighting systems are used in one location, these intelligent lighting systems can be synchronized by using the data transmission mode of the lighting LED array of a master intelligent lighting system. The master intelligent lighting system can be used to (a) control the duty cycle of many slave intelligent lighting systems, (b) detect the ambient light intensities, (c) control the lighting of many slave intelligent lighting systems, by using one or more of the lighting LED arrays of the mater intelligent lighting system to transmit control data to the slave intelligent lighting systems, using one of more of the lighting LED arrays of each of the slave intelligent lighting systems as the control data receivers, and using the processors of each slave intelligent lighting systems to decode the control data and adjust the lighting of the slave intelligent lighting systems.

Figure 9:
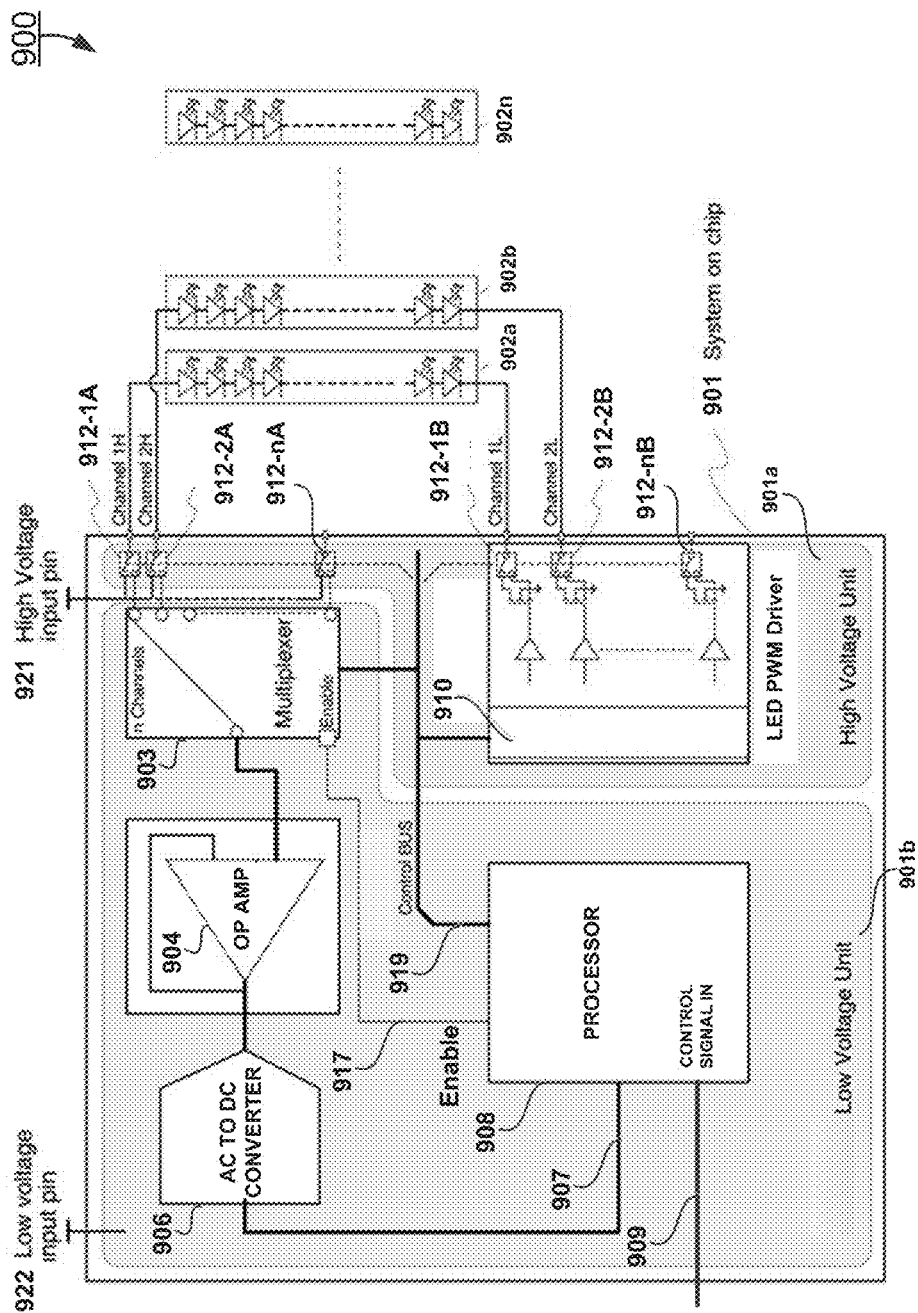
FIG. 9 shows an intelligent lighting system 900 having an LED array light fixture, a system-on-a-chip light fixture control and ambient light detection functionalities according to one embodiment of the present invention.

Referring now to FIG. 9, an intelligent lighting system 900 having an LED array light fixture, a system-on-a-chip light fixture control and ambient light detection functionalities is shown according to one embodiment of the present invention.

The intelligent lighting system 900 includes a system-on-chip 901 and n lighting LED arrays 902a, 902b, . . . , and 902n as shown in FIG. 9. These n lighting LED arrays are configured to operate in both light emission mode and light detection mode. For ease of illustration, two LED arrays of the multiple LED arrays, a first set of switching devices 912-1A, 912-2A, . . . , 912-nA, a second set of switching devices 912-1B, 912-2B, . . . , 912-nB, are identified for detailed discussion. The applicable LED arrays, however, are not limited to the identified lighting LED arrays. It is known to the art that more than two LED arrays may be adopted without departing from the scope of the present disclosure.

The system-on-chip 901 includes a high voltage unit 901a and a low voltage unit 901b. The high voltage unit 901a includes an LED power width modulation (PWM) driver 910, a first switching device 912-1A, a second switching device 912-2A, . . . , and a n-th switching device 912-nA. The second set of switching devices 912-B also includes n switching devices: a first switching device 912-1B, a second switching device 912-2B, . . . , and a n-th switching device 912-nB. The low voltage unit 901b includes an analog to digital convertor (ADC) 906, an operational amplifier 904, a processor 908, and an n channel multiplexer 903. The included elements in the high voltage unit 901a, for instance, the gate controls, may generally accept high DC voltage, for example, 24 VDC, or 48 VDC, from a high voltage input pin 921, however, the included elements in the low voltage unit 901b, for instance, the processor 908, can accept only low DC voltage, for example, 5 VDC, or 3.7 VDC, from a low voltage input pin 922. The high voltage unit 901a and the low voltage unit 901b work together to control the LED lighting intensity and to detect ambient light. The purpose of differentiating low voltage unit 901b from high voltage unit 901a is to protect the low voltage unit 901b from possible harmful high DC voltage.

The operational amplifier 904 is provided to further enhance the discernibility of ambient light photovoltaic voltage waveforms generated by the lighting LED arrays.

The Analog to digital Converter (ADC) 906 is provided for digitizing of the ambient light photovoltaic voltages generated by the lighting LED arrays, converting the digitized analog voltage into digital signals, and submitting the digital signals to the processor 908 for further analysis.

The processor 908 is a central processing unit, a microprocessor, or any computer means that can determine the ambient light intensities based on the generated ambient light photovoltaic voltage waveforms. The processor 908 has a digital input 907 from the analog to digital converter 906, a control signal input 909 to receive control signal from the intelligent lighting control module 20, a control bus 919 to the LED PWM driver 910 to control the duty cycle of the n sets of lighting LED arrays 902a, 902b, . . . , and 902n, an enable line 917 to the n channel multiplexer 903, and an control bus 919 having n wires controlling the first switching devices 912-1A, 912-2A, . . . , 912-nA of the first set of switching devices 912-A, and the second switching devices 912-1B, 912-2B, . . . , 912-nB of the second set of switching devices 912-B, respectively. The LED PWM driver 910 is used to receive duty cycle control from the processor 908, to adjust the duty cycle of the lighting LED arrays, and provide lighting through the n sets of lighting LED arrays 902a, 902b, . . . , and 902n when the n sets of lighting LED arrays are operating in light emission mode.

The n channel multiplexer 903 is provided for selection of one of the lighting LED arrays for ambient light detection. In accordance to one embodiment of the present disclosure, the output terminal of the n channel multiplexer 903 is coupled to the input terminal of the operational amplifier 904, and the n input terminals of the n channel multiplexer 903 are coupled to the n first switching devices 912-1A, 912-2A, . . . , and 912-nA, respectively.

The first set of switching devices 912-1A, 912-2A, . . . , 912-nA and the second set of switching devices 912-1B, 912-2B, . . . , 912-nB are provided for arrangement of SOC 901 to operate the LED arrays in light emission mode, light detection mode, or data transmission mode.

The first switching device 912-1A of the first set of switching devices is coupled to the high voltage input pin 921, the multiplexer 903, the control bus 919 that is in communication with the processor 908, and the anode of the first lighting LED array 902a. The second switching device 912-2A of the first set of switching devices is also coupled to the high voltage input pin 921, the multiplexer 903, the control bus 919 that is in communication with the processor 908, and the anode of the second lighting LED array 902b.

The first switching device 912-1B of the second set of switching devices is coupled to a ground voltage, the control bus 919 in communication with the processor 908, the LED PWM driver 910, and the cathode of the first lighting LED array 902a. The second switching device 912-2B of the second set of switching devices is coupled to a ground voltage, the control bus 919 in communication with the processor 908, the LED PWM driver 910, and the cathode of the second lighting LED array 902b.

The control bus 919 is provided to couple the output control of the processor 908 to the LED PWM driver 910, the first set of switching devices 912-1A, 912-2A, . . . , 912-nA, the second set of switching devices 912-1B, 912-2B, . . . , 912-nB, and the multiplexer 903. The processor 908 may manipulate and operate each coupled element by identifying the address of the elements via the control bus.

An enable line 917 is also provided to enable the n channel multiplexer 903 when the lighting LED arrays are operating in light detection mode. In certain embodiments, the operational amplifier 904 and the ADC 906 are enabled only if the LED arrays are operating in light detection mode for energy conservation and avoid unwanted noises.

Although only two LED arrays are described here for illustrative purpose, it is known in the art that a single LED array can also serve the functions of light emission, ambient light detection, and data transmission. If only a single LED array is adopted, the skilled in the art can modify the disclosed SOC 901 to remove the n channel multiplexer 903 and to couple a ping of first switching device 912-1A to the input terminal of the operational amplifier 904.

The lighting LED arrays 902a, 902b, . . . , 902n are used in three separate functions in three distinctive modes: (a) emitting lights in a light emission mode, (b) detecting ambient light in a light detection mode, and (c) transmitting digital data in data transmission mode.

The LED lighting intensity control is achieved by co-operation of the processor 908 in the low voltage unit 901b, and the LED PWM Driver 910 in the high voltage unit 901a. The processor 908 communicates with the LED PWM Driver 910 over the control bus 919 to provide instructions to control the output of the lighting LED arrays 902a, 902b, . . . , 902n through the LED PWM Driver 910, and then the LED PWM Driver 910 provide power to the first lighting LED array 902a, and the second lighting LED array 902b at the level based on the instructions from the processor 908. The LED PWM Driver 910 includes a PWM Engine to control the duty cycle of the output to the lighting LED arrays, hence controlling the power output of the lighting LED arrays.

In operation, when the first lighting LED array 902a is operating in light emission mode, the switching device 912-1A and the switching device 912-1B enable the first lighting LED array 902a to be electrically connected to the LED PWM driver 910 while the anode of first lighting LED array 902a is electrically connected to the high voltage input 921 (DC power source). When the second lighting LED array 902b is operating in light emission mode, the second switching device 912-2A and the second switching device 912-2B enable the second lighting LED array 902b to be electrically connected to the LED PWM driver 910 while the anode of the second lighting LED array 902b is electrically connected to the high voltage input 921. The n channel multiplexer 903, the operational amplifier 904, and the ADC 906 are disabled by the enable line 917.

Figure 10:
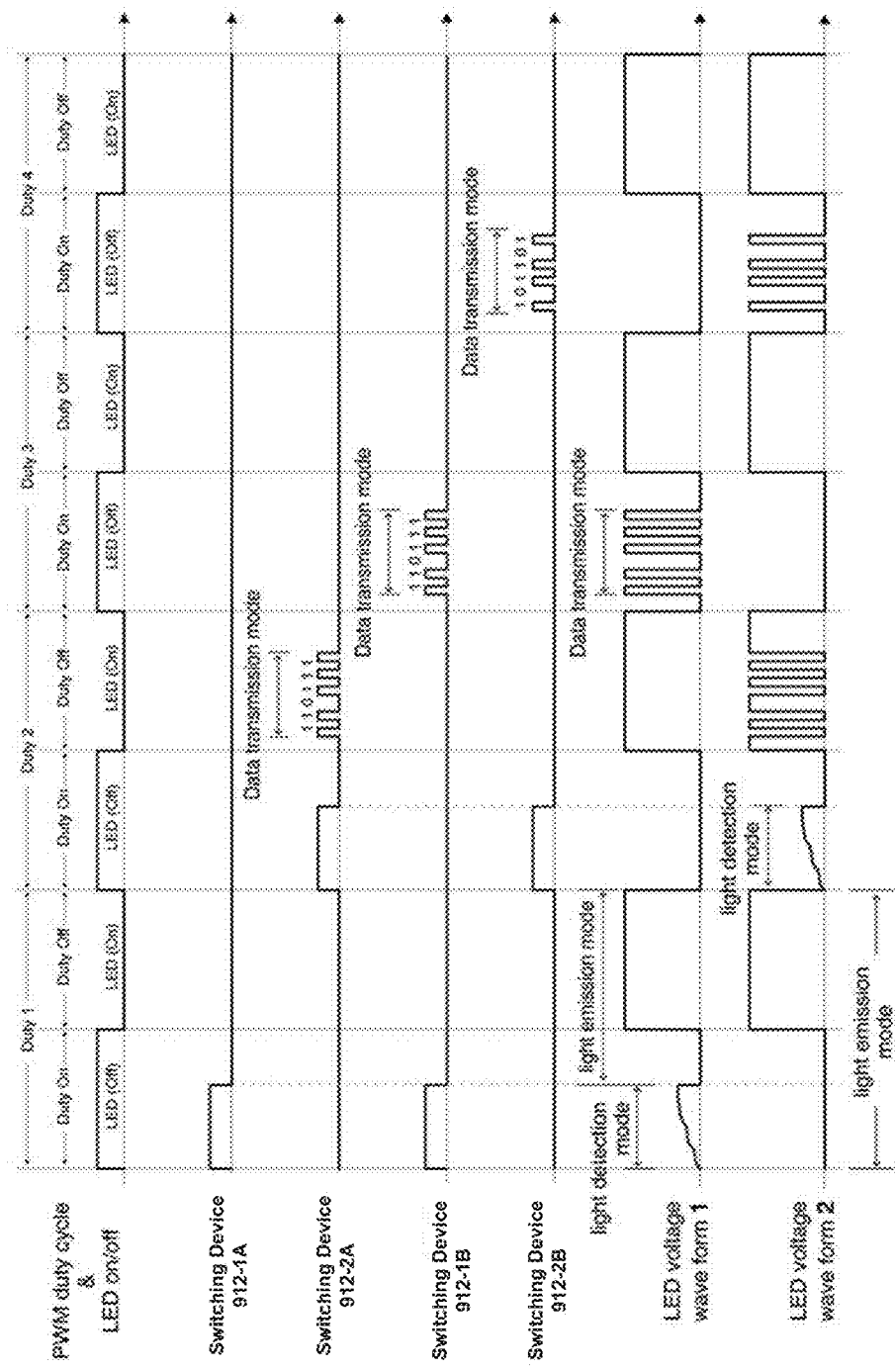
FIG. 10 displays the different waveforms at various location of the LED light fixture with light fixture control and ambient light detection shown in FIG. 9 according to one embodiment of the present invention.

With reference to FIG. 10, when the lighting LED arrays are operating in light emission mode, the processor 908 initially maintains control of the first and second set of switching devices, and arranges the lighting LED arrays to emit with a stable duty cycle controlled by the LED PWM driver 910, as shown in the PWM duty 1 to duty 4. Taking PWM duty 1 as an example, when the LED PWM driver 910 is in duty-on state, the lighting LED array 902a is generally turned off. When the LED PWM Driver 910 is in duty-off state, the lighting LED array 902a is generally turned on. The light emission of the intelligent lighting system 900 is thus determined in accordance to the duty cycle of the LED PWM Driver 910.

The first lighting LED array 902a is coupled to the switching device 912-1A and the switching device 912-1B. The second lighting LED array 902b is coupled to the switching device 912-2A and the switching device 912-2B. These switching devices are used to (a) control the duration of the light detection mode, and (b) transmit digital signal in data transmission mode according to the instructions from the processor 908.

Referring now to FIG. 10, a series of voltage waveforms relating to multiple lighting LED arrays for driving the lighting LED arrays, detecting ambient light intensities, transmitting digital signal and controlling the LED lights of the system-on-chip 901 is shown according to one embodiment of the present disclosure. The first switching device 912-1A of the first set of switching devices and the first switching device 912-1B of the second set of switching devices are synchronized; and the switching device 912-2A and the second switching device 912-2B of the second set of switching devices are also synchronized.

During the Duty 1 when the lighting LED array 902a is off (duty-on period), the switching device 912-1A and the switching device 912-1B are turned open such that the LEDs mounted on the lighting LED array 902a are in the light detection mode (all off), and the ambient light produce a voltage across the first lighting LED array 902a that is proportional to the ambient light intensity at the moment.

During the Duty 2 when the second lighting LED array 902b is off (duty-on period), the switching device 912-2A and the second switching device 912-2B of the second set of switching devices are turned open such that the LEDs mounted on the LED array 902b are in the light detection mode (all off), and the ambient light produce a voltage across the second lighting LED array 902b that is proportional to the ambient light intensity at the moment.

The switching devices 912-1A, 912-1B, 912-2A and 912-2B are not necessary to be turned on for every lighting LED arrays lights off cycle. However, if they are to be turned on, they can only be turned on during the lighting LED arrays lights off cycle. The light detection mode is defined as the gate controls are open for a relatively long time to allow the lighting LED arrays to collect electric potential across the LEDs during the LEDs lights off cycle. The light emission mode is defined as the LED arrays are not in the light detection mode. The data transmission mode is defined as the any time the switching devices are actively transmitting digital signal.

During the light detection period, the corresponding gate controls are open (e.g., connecting the LEDs with the multiplexer 903 and the ground), and LEDs are off. For example, the LEDs installed on the first lighting LED array 902a accumulate electric charge across both ends of the lighting LED array 902a and the voltage is applied to the terminal channel 1H of the switching device 912-1A and the terminal of channel 1L of the switching device 912-1B. Since the switching device 912-1A and the switching device 912-1B are open during the light detection mode, the voltage accumulated across the terminal channel 1H of the switching device 912-1A and the terminal of channel 1L of the switching device 912-1B is received by the first input terminal of the n channel multiplexer 903, and sent to the input terminal of the operational amplifier 904. The voltages at the input and output ends of the operational amplifier 904 are analog voltages and the amplitudes of the voltages are proportional to the ambient light intensity surrounding the lighting LED array 902a. The analog voltage is digitized by the Analog to Digital Converter (ADC) 906, and sent to the processor 908.

In operation, when the first lighting LED array 902a is operating in light detection mode, the switching device 912-1A and the switching device 912-1B enable the first lighting LED array 902a to be electrically connected to the operational amplifier 904 via the n channel multiplexer 903 while the other node of the lighting LED array 902a is electrically connected to the ground of the DC source. When the second lighting LED array 902b is operating in light detection mode, the switching device 912-2A and the switching device 912-2B enable the second lighting LED array 902b to be electrically connected to the operational amplifier 904 via the n channel multiplexer 903 while the other node of the second lighting LED array 902b is electrically connected to the ground of the DC power. The n channel multiplexer 903, the operational amplifier 904, and the ADC 906 are all enabled by the enable line 917 of the processor 908.

In light detection mode, when the first lighting LED array 902a and the second lighting LED array 902b are exposed to ambient light, ambient light photovoltaic voltage waveforms in response to the ambient light intensity are generated by the first lighting LED array 902a and the second lighting LED array 902b respectively. The ambient light photovoltaic voltage waveforms are shown as LED voltage waveform 1 and LED voltage waveform 2 within PWM duty cycle 1 and PWM duty cycle 2 respectively. At least one photovoltaic output of the lighting LED arrays is electrically coupled to operation amplifier 904 to enhance the discernibility of ambient light photovoltaic voltage waveforms generated by the first and the second lighting LED arrays 902a and 902b. The amplified ambient light photovoltaic voltage waveform is then digitized by the analog to digital converter (ADC) 906. In certain embodiments, if the LED arrays become more sensitive to ambient lights or that if ADC 906 becomes more sensitive in its analog signal detection, this operational amplifier 904 may not be necessary.

The ADC 906 digitizes ambient light photovoltaic voltage waveform and submits this digitized voltage to the input terminal of the processor 908. As shown in FIG. 6B, the processor 908 saves the sampled ambient light photovoltaic voltage waveform as a vector Y and compares vector Y with a reference vector table R that represents the various ambient light intensity references. The processor 908 then identifies a particular vector of the reference vector table R with the lowest variance when comparing with Y, and records the corresponding intensity. The ambient light intensity L is thus determined.

The processor 908 then controls the LED PWM Driver 910 to adjust the illumination of the intelligent lighting system 900 according to the determined ambient light intensity.

The data transmission mechanism may be applicable in one PWM duty cycle in which the lighting LED arrays are operating in light detection mode or light emission mode. Taking PWM cycle 2 as an example, the processor 908, during the second lighting LED array 902b on state (duty-off), may turn on and off the switching device 912-2A so that the second lighting LED array 902b blinks a controlled pattern to transmit data in accordance with a communication protocol. In other words, in this duty off period, the PWM engine and switching device 912-2B connects the cathode of the LED array 902b to the ground. But turning on and off the switching device 912-2A can close and open the connection between the high voltage input pin 921 and the anode of the LED array 902b. For example, when the LED PWM driver 910 turns on the lighting LED array 902a after ambient light detection, the processor 908 may turn on-and-off the second lighting LED array 902b by operating the switch of the switching device 912-2A. The lighting LED array 902b blinks accordingly in a very high frequency within a very short period of time in contrast to the determined duty cycle. A remote sensor or a remote receiver can then decode the detected blinking frequency and pattern as the digital data transmitted. One advantage in accordance with one embodiment of the present disclosure is that the disclosed may provide illumination function, ambient light detection, and data transmission during one duty cycle.

The digital signals can be transmitted during the lighting LED arrays on cycle or off cycle. The digital signals (data) are transmitted through the lighting LED arrays themselves. The digital signal is encoded and generated by the processor 908 according to various needs and sent to the LED PWM Driver 910 and the digital signals are superimposed onto the LED light driving voltage.

In operation, the switching device 912-1A and the switching device 912-1B enable the cathode of the first lighting LED array 902a to be electrically connected to the LED PWM driver 910 while the anode of the first lighting LED array 902a is electrically connected to the high voltage input pin 921 of a DC source.

The switching device 912-2A and the switching device 912-2B enable the cathode of the second lighting LED array 902b to be electrically connected to the LED PWM driver 910 while the anode of the second lighting LED array 902b is electrically connected to the high voltage input pin 921 of the DC source.

The processor 908 sends switching device gate control signals to switching devices. The n channel multiplexer 903, the operational amplifier 904, and the ADC 906 are disabled by the enable line 917.

Referring to FIG. 10 and taking PWM duty cycle 3 as an example, the processor 908, during the first lighting LED array 902a off state (duty on), may turn on and off the switching device 912-1B so that the LED blinks a controlled pattern to transmit data in accordance with a communication protocol. In this period, the LED PWM driver 910 is off and does not allow current to flow through. The switching device 912-1A is always off in this period and connects the high voltage input pin 921 to the anode of the LED array 902a. The processor 908 may turn on and off the switching device 912-1B to connect and disconnect the cathode of the LED array 902a with the ground. Accordingly, the LED array 902a blinks in accordance with the control of the processor 908 to transmit data signals.

In certain embodiments, the first lighting LED array 902a can blink in a very high frequency within a very short period of time in contrast to the determined duty cycle. Although the blinking is undetectable to human eyes, it is detectable to a remote sensor (not shown). The remote sensor can then translate the detected blinking frequency and pattern as a digital signal data. One advantage in accordance with one embodiment of the present disclosure is that data can be transmitted via the normal characteristic of blinking of the LED arrays as generated by an intelligent lighting system, and without changing the illumination duty cycle of the system.

Alternatively, when the LED PWM driver 910 turns on the first lighting LED array 902a, the processor 908 may turn on-and-off the first lighting LED array 902a by controlling the switches of switching device 912-1A. Data can thus be transmitted accordingly as discussed above. An electronic circuitry (now shown), however, may be included to reduce unwanted current flows for further protection of the lighting LED array 902a.

One of the ordinary skills may modify the disclosed mechanism and apply the mechanism to more than two LED arrays without departing from the scope of the present disclosure. For example, a similar data transmission mechanism is also applicable to the second lighting LED array 902b, the switching device 912-2A, and the switching device 912-2B.

Figure 11:
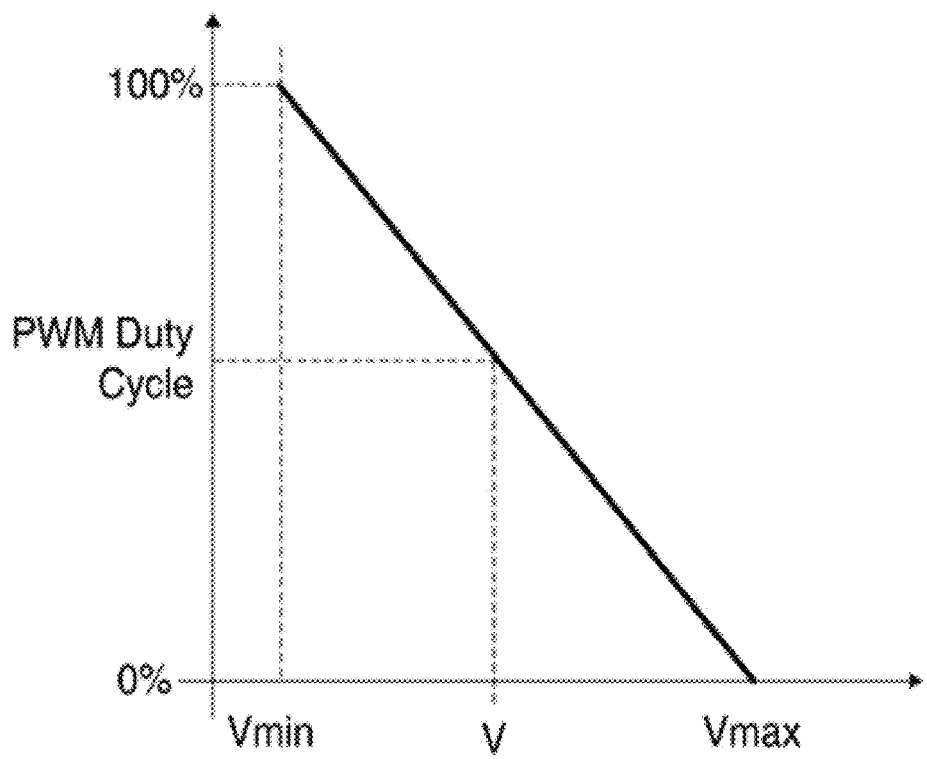
FIG. 11 shows a graph for duty cycle adjustments in response to ambient light intensities determined according to one embodiment of the present disclosure.

Reference is made to FIG. 11, where V represents the photovoltaic voltage detected under current ambient light intensity, $V_{min}$ represents the photovoltaic voltage detected under the lowest ambient light intensity, and $V_{max}$ represents the photovoltaic voltage detected under the ambient light intensity where no additional lighting is needed.

Following description is directed to a method how the detected ambient light intensity is used to control the lighting of LED arrays to provide sufficient lighting for safety and minimize the energy consumption. The steps include:

(a) arranging the first lighting LED array 902a to operate in a light emission mode and a light detection mode;
(b) controlling the lighting function of the first lighting LED array 902a by the LED PWM driver 910;
(c) continually or continuously determining the ambient light intensities when the first lighting LED array 902a operates in light detection mode;
(d) adjusting the ambient lighting to the lowest light intensity possible;
(e) measuring the ambient light photovoltaic voltage and saving it as $V_{min}$;
(f) adjusting the ambient lighting to a light intensity that is sufficient for safety and security and there is no need for additional lighting;
(g) measuring the ambient light photovoltaic voltage and saving it as $V_{max}$;
(h) providing the area with a number of LED arrays such that the area has sufficient lighting when the ambient lighting is at the lowest light intensity possible level; and
(i) controlling the duty cycle of these LED arrays using following formula to provide supplemental lighting to ensure sufficient lighting for safety and to minimizing energy consumption:

$$\text{Duty Cycle}=100*V/(V_{min}-V_{max})+100*V_{max}/(V_{max}-V_{min})$$

The duty cycle is at 100% when the detected ambient light intensity V equals to $V_{min}$ and it needs full power of the LED arrays used. The duty cycle is at 0% when the detected ambient light V equals to $V_{max}$, and no additional lighting is needed.

It should be noted that various methods can be applied toward steps (c), (e), and (g) to determine ambient light intensities without departing from the spirit of the present disclosure. For example, ambient light intensities detected by the LED arrays can be determined by comparing to a predetermined reference table as disclosed previously. Alternatively, ambient light intensity can be determined by identifying the maximum rising slope of a particular ambient light photovoltaic voltage waveform generated by the LED arrays within a predetermined period of time.

Figure 12:
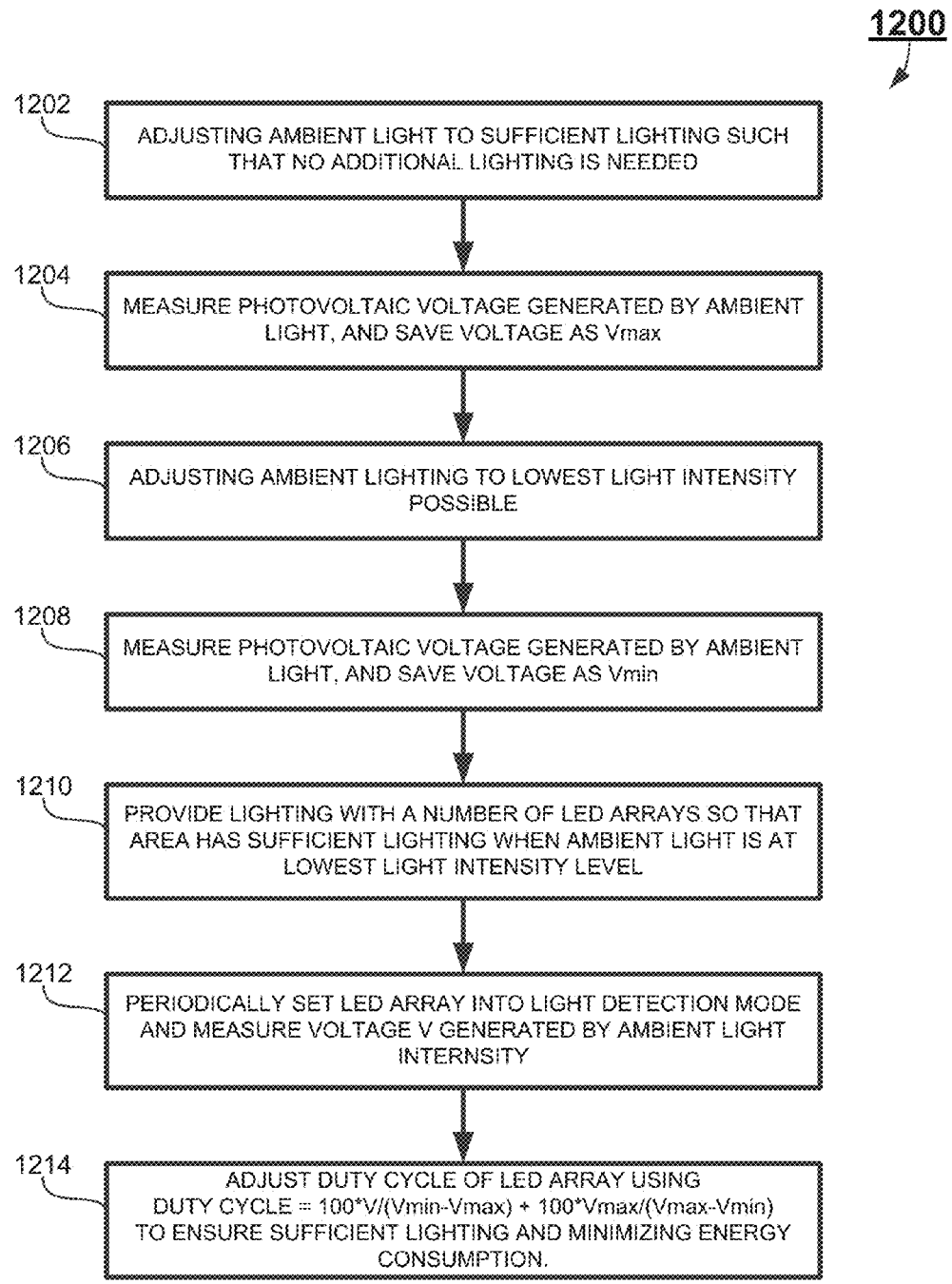
FIG. 12 shows a flow chart of an intelligent lighting system controlling the PWM duty cycle to regulate lighting provided by LED arrays so that the intelligent lighting system provides sufficient light to area to ensure safety compliance and minimizes energy consumption by the LED arrays according to certain embodiments of the present disclosure.

FIG. 12 shows a flow chart 1200 of an intelligent lighting system controlling the PWM duty cycle to regulate lighting provided by lighting LED arrays so that the intelligent lighting system provides sufficient light to area to ensure safety compliance and minimizes energy consumption by the LED arrays according to certain embodiments of the present disclosure. In certain embodiments, an intelligent lighting system 900 as shown in FIG. 9 is used to provide lighting to an area. The intelligent lighting system 900 includes one or more LED arrays to provide lighting to the area. The lighting LED arrays are configured to operate in light emission mode to provide lighting to the area and in light detection mode to measure ambient light so that the intelligent lighting system 900 can utilize the measured ambient light to adjust the lighting output to provide sufficient lighting to the area for safety compliance and minimize the energy consumption of the LED arrays.

At operation 1202, an operator adjusts the ambient light intensity to a level that there is sufficient lighting so that no additional lighting is needed for safety compliance.

At operation 1204, the operator sets the lighting LED arrays to the light detection mode, and measure the photovoltaic voltage generated by the lighting LED arrays. The measured voltage is designated as $V_{max}$ and the $V_{max}$ is saved in the storage of the processor 908.

At operation 1206, the operator adjusts the ambient light intensity to the lowest level possible so that additional lighting is needed for safety compliance.

At operation 1208, the operator sets the LED arrays to the light detection mode again, and measure the photovoltaic voltage generated by the LED arrays. The measured voltage is designated as $V_{min}$ and the $V_{min}$ is also saved in storage of the processor 908.

At operation 1210, still at the lowest ambient light level, the operator provides sufficient LED arrays to illuminate the area with sufficient lighting so that it is safety compliant.

At operation 1212, the lighting LED arrays of the intelligent lighting system 900 is periodically set to light detection mode, and measure the photovoltaic voltage generated by ambient light through the lighting LED arrays. This measure voltage is designated as V.

At operation 1214, the intelligent lighting system 900 adjusts the duty cycle of the LED PWM driver 910 using following formula based on the measured voltage V, and saved voltages $V_{max}$ and $V_{min}$:

$$\text{Duty Cycle} = 100 \cdot V / (V_{min} - V_{max}) + 100 \cdot V_{max} / (V_{max} - V_{min})$$

The duty cycle is at 100% when the detected ambient light intensity V equals to $V_{min}$ and the LED arrays provide maximum amount of lighting. The duty cycle is at 0% when the detected ambient light V equals to $V_{max}$, and no additional lighting is needed. Therefore, the intelligent lighting system 900 is able to provide sufficient lighting when the lighting is needed for safety compliance, and to reduce the energy consumption of the LED arrays as detected ambient light intensity increased until the ambient light is sufficient to turn off the LED arrays to save energy. Exemplary applications of the intelligent lighting system 900 include office, hallway, and parking lot lighting.

There is no specification on the characteristics of the lighting LED arrays. The lighting LED arrays can be white, a composition of red, green, and blue, or the equivalents, as long as the lighting LED arrays are able to (a) emit lights, (b) detect ambient lights, and (c) transmit data. It is preferable that the LED array can generate discernible ambient light photovoltaic voltage waveforms when exposed to the different ambient lights.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An intelligent lighting control system comprising:
    an intelligent lighting system configured to provide lighting through at least one lighting diode (LED) array,
    an intelligent power control configured to allow an operator to control the lighting of the intelligent lighting system;
    an AC power source configured to provide AC power to the intelligent lighting system;
    an intelligent power supply configured to combine the control signal from the intelligent power control and AC power supply from the AC power source; and
    a DC power supply configured to provide DC power supply to control circuits and the at least one lighting LED array;
    wherein the intelligent lighting system comprises:
        a plurality of LEDs forming the at least one lighting LED array, configured to operate in a light emission mode, a light detection mode and a data transmission mode;
        a light detection module configured to detect the ambient lighting, convert detected ambient lighting to digital data;
        a processor configured to receive digital control signal from the intelligent power control, and the digital data representing ambient light from the light detection module; and
        an LED power width modulation (PWM) driver in communication with the processor, configured to receive control signal from the processor and control the lighting of the lighting LED array according to the control signal from the processor.

2. The intelligent lighting control system of claim 1, wherein the intelligent power control
    interrupts the power transmission from the intelligent power supply to the intelligent lighting system to transmit control signals and the control signals control turning on/off, and changing brightness, color, and temperature of the at least one lighting LED array, and
    uses a control signal transmitter and a control signal receiver to control signals control turning on/off, and changing brightness, color, and temperature of the at least one lighting LED array, wherein the control signal transmitter comprises the at least one lighting LED array, a separate lighting LED, and a separate light emitter, and the control signal receiver comprises the at least one lighting LED array operating in a light detection mode, and a separate light sensor.

3. The intelligent lighting control system of claim 2, wherein the intelligent power supply encodes the control signals received from the intelligent power control, modulates the encoded control signal, combines the modulated encoded control signal and transmits the combined signal to the intelligent lighting system.

4. The intelligent lighting control system of claim 3, wherein the intelligent power supply transmits the combined signal to the intelligent lighting system in at least one of the two methods: over an electric power wire, or over a light transmitter and light receiver pair using light or infrared signal.

5. The intelligent lighting control system of claim 4, wherein the light receiver of the light transmitter and light receiver pair comprises at least one of an LED the LEDs operating in a light detection mode, and a light sensor.

6. The intelligent lighting control system of claim 3, wherein the intelligent lighting system decodes the modulated encoded control signal and performs control functions.

7. The intelligent lighting control system of claim 3, wherein the intelligent lighting control system further comprises a filter configured to decode the modulated encoded control signal and to transmit the digital control signal to a control signal input terminal of the intelligent lighting system.

8. The intelligent lighting control system of claim 1, wherein the intelligent lighting control system further comprises a CAT-5 data cable configured to transmit the output of the intelligent power supply to the intelligent lighting system.

9. The intelligent lighting control system of claim 8, wherein the wires of the CAT-5 data cable are combined to form a two wire power transmission line.

10. The intelligent lighting control system of claim 1, wherein the DC power supply comprises:
an AC to DC converter circuit configured to convert the AC to DC; and
a regulator circuit configured to provide steady and precise DC voltage for the intelligent lighting system.

11. The intelligent lighting control system of claim 1, wherein the DC power supply further comprises a DC to DC converter circuit to provide multiple DC voltages for the control circuit of the intelligent lighting system and driving the at least one lighting LED array separately.

12. The intelligent lighting control system of claim 1, wherein the light detection module comprises:
a first gate control;
a second gate control;
an operational amplifier configured to receive photovoltaic voltage generated by the lighting LED array during the lighting LED array light off cycle and when the lighting LED array is operating in light detection mode and amplify the receive photovoltaic voltage as a measurement of ambient light intensity; and
an analog to digital converter configured to convert the amplified photovoltaic voltage into digital data,
wherein the anode of the lighting LED array is electrically coupled to the first gate control, a power supply, and the processor, and the cathode of the lighting LED array is electrically coupled to the second gate control, a ground voltage, and the processor, respectively, and the processor controls the switches of the first gate control and the second gate control such that the lighting LED array is arranged to operate in light emission mode, light detection mode and the data transmission mode in a PWM duty cycle.

13. The intelligent lighting control system of claim 12, wherein the photovoltaic voltage is detected within a predetermined period of time after the lighting LED array are set to operate in light detection mode and the lighting LED array is not in light emission mode;
storing $V_{max}$ if the variable V is greater than $V_{max}$; and
storing $V_{min}$ if the variable V is less than $V_{min}$.

14. The intelligent lighting control system of claim 1, wherein the light detection module comprises:
an separate light sensor;
an operational amplifier configured to receive the output of the separate light sensor representing the ambient lighting; and
an analog to digital converter configured to convert the amplified photovoltaic voltage into digital data,
wherein the output of the separate light sensor is electrically coupled to the input of the operational amplifier, the output of the operational amplifier is electrically coupled to the analog to digital converter, and the output of the analog to digital converter is electrically coupled to the digital data input of the processor, and the processor controls the output of the LED PWM Driver such that the lighting intensity of the lighting LED array is controlled.

15. A method of operating an intelligent lighting control system comprising:
providing a lighting LED array configured to operate in light emission mode and light detection mode;
controlling the lighting LED array by an LED power width modulation (PWM) driver of an intelligent lighting system coupled to the lighting LED array;
periodically determining ambient light intensities with a light detection device, and storing the average voltage of the ambient light intensities measured as a variable V;
adjusting ambient light to sufficient lighting such that no additional lighting is needed, and store the average voltage of the ambient light intensity measured as a constant $V_{max}$;
adjusting ambient light to lowest lighting such that additional lighting is needed, and store the average voltage of the ambient light intensity measured as a constant $V_{min}$;
providing lighting with sufficient number of LED in the lighting LED array such that the area has sufficient lighting when the ambient light is at the lowest light intensity; and
controlling duty cycle of the LED PWM driver based on the variable V, and two constants $V_{max}$, and $V_{min}$.

16. The method of claim 15, wherein the light detection device comprises:
a first gate control;
a second gate control;
an operational amplifier configured to receive photovoltaic voltage generated by the lighting LED array during the lighting LED array light off cycle and when the lighting LED array is operating in light detection mode and amplify the receive photovoltaic voltage as a measurement of ambient light intensity; and
an analog to digital converter configured to convert the amplified photovoltaic voltage into digital data,
wherein the anode of the lighting LED array is electrically coupled to the first gate control, a power supply, and the processor, and the cathode of the lighting LED array is electrically coupled to the second gate control, a ground voltage, and the processor, respectively, and the processor controls the switches of the first gate control and the second gate control such that the lighting LED array is arranged to operate in light emission mode, light detection mode and the data transmission mode in a PWM duty cycle.

17. The method of claim 16, wherein the photovoltaic voltage is detected within a predetermined period of time after the lighting LED array are set to operate in light detection mode and the lighting LED array is not in light emission mode.

18. The method of claim 15, wherein the light detection device comprises:
an separate light sensor;
an operational amplifier configured to receive the output of the separate light sensor representing the ambient lighting; and
an analog to digital converter configured to convert the amplified photovoltaic voltage into digital data,
wherein the output of the separate light sensor is electrically coupled to the input of the operational amplifier, the output of the operational amplifier is electrically coupled to the analog to digital converter, and the output of the analog to digital converter is electrically coupled to the digital data input of the processor, and the processor controls the output of the LED PWM Driver such that the lighting intensity of the lighting LED array is controlled.

19. The method according to claim 15, further comprising: storing $V_{max}$ if the variable V is greater than $V_{max}$; and storing $V_{min}$, if the variable V is less than $V_{min}$.

20. The method according to claim 15, wherein the duty cycle is determined by a formula as below:

$$\text{Duty Cycle}=100*V/(V_{min}-V_{max})+100*V_{max}/(V_{max}-V_{min}).$$

21. A non-transitory computer storage medium having computer-executable instructions stored thereon which, when executed by a processor of an intelligent lighting system, cause the processor to
- provide N lighting LED arrays arranged to operate in light emission mode and light detection mode;
- control the N lighting LED arrays by a power width modulation (PWM) driver embedded in a system-on-chip coupled to the N lighting LED arrays;
- periodically determine ambient light intensities with a light detection device, and store the average voltage of the ambient light intensities measured as a variable V;
- adjust ambient light to sufficient lighting such that no additional lighting is needed, and store the average voltage of the ambient light intensity measured as a constant $V_{max}$;
- adjust ambient light to lowest lighting such that additional lighting is needed, and store the average voltage of the ambient light intensity measured as a constant $V_{min}$;
- provide lighting with sufficient number of lighting LED arrays such that the area has sufficient lighting when the ambient light is at the lowest light intensity; and control duty cycle of the PWM driver based on the variable V, and two constants $V_{max}$, and $V_{min}$.

22. The non-transitory computer storage medium of claim 21, wherein the light detection device comprises at least one of the N lighting LED arrays operating in a light detection mode, and a light sensor.

23. The non-transitory computer storage medium of claim 21, further comprising the computer-executable instructions to store $V_{max}$ if the variable V is greater than $V_{max}$; and to store $V_{min}$ if the variable V is less than $V_{min}$.

24. The non-transitory computer storage medium of claim 21, wherein the duty cycle is determined by a formula as below:

$$\text{Duty Cycle}=100*V/(V_{min}-V_{max})+100*V_{max}/(V_{max}-V_{mm}).$$

25. The intelligent lighting control system of claim 3, wherein the intelligent lighting system further comprises:
- at least one first switching device in communication with the processor through a first control bus and selectively to allow and disallow current to flow from each of the LEDs to the light detection module, wherein the first switching device is configured to selectively connect each of the LEDs with the DC power supply;
- at least one second switching device in communication with the processor through a second control bus, wherein the second switching device is configured to selectively connect each of the LEDs with a ground voltage or with the LED PWM driver;
- wherein the processor is configured to, for each of the LEDs:
  - control the second switching device to allow the LED PWM driver to energize and de-energize the LED in a duty-off period and a duty-on period of a cycle, respectively; and
  - control the first and second switching devices to allow a detection current to flow from the LED to the light detection module in the duty-off period, wherein the detection current is generated by the LED in response to receiving external light.

\* \* \* \* \*